US012018519B2

(12) United States Patent
Salcido

(10) Patent No.: US 12,018,519 B2
(45) Date of Patent: Jun. 25, 2024

(54) LOCKING DEVICE

(71) Applicant: Crystal Salcido, El Paso, TX (US)

(72) Inventor: Crystal Salcido, El Paso, TX (US)

( * ) Notice: Subject to any disclaimer, the term of this patent is extended or adjusted under 35 U.S.C. 154(b) by 8 days.

(21) Appl. No.: 17/729,946

(22) Filed: Apr. 26, 2022

(65) Prior Publication Data

US 2023/0340817 A1 Oct. 26, 2023

(51) Int. Cl.
*E05C 19/18* (2006.01)
*E05C 17/54* (2006.01)

(52) U.S. Cl.
CPC ............ *E05C 19/184* (2013.01); *E05C 17/54* (2013.01); *E05C 19/18* (2013.01)

(58) Field of Classification Search
CPC ...... E05C 19/184; E05C 19/18; E05C 19/182; E05C 19/004; E05C 1/006; E05C 19/003
See application file for complete search history.

(56) References Cited

U.S. PATENT DOCUMENTS 3,583,738 A * 6/1971 Uphoff .................... E05C 19/10 292/114
3,761,118 A * 9/1973 Westcott ............... E05C 19/184 292/346
3,955,841 A * 5/1976 Walker .................. E05C 19/003 292/259 R
4,082,334 A * 4/1978 Volta ..................... E05C 19/003 292/288
4,105,232 A * 8/1978 Miels .................... E05C 19/184 292/288
4,379,576 A * 4/1983 Blough ................. E05B 67/383 292/205
4,429,911 A * 2/1984 O'Neal ................. E05C 19/003 292/259 R
4,530,531 A 7/1985 Mantini
4,955,648 A * 9/1990 Miller ..................... E05C 19/18 292/288
4,958,868 A * 9/1990 Watrous, Jr. .......... E05C 19/184 292/258
5,098,142 A * 3/1992 Fontenot ............... E05C 19/184 292/288

(Continued)

FOREIGN PATENT DOCUMENTS

DE 325046 C * 9/1920
EP 0740043 A2 10/1996
GB 2131866 A * 6/1984 ........... E05C 19/184

*Primary Examiner* — Christine M Mills
*Assistant Examiner* — Faria F Ahmad

(57) ABSTRACT

A door locking device including a non-tethered latch having two or more elongate shafts extending in a downward direction from lateral portions of the latch, the shafts being oriented perpendicular to one another. The latch also includes a curved handle protruding from the top of the latch. The latch is configured to mate with locking plates configured to be mounted to a door and a door frame or wall adjacent to where the door opens. A lower end of at least one of the vertical elongate shafts of the latch is made of a flexible material and is wedge-shaped, having a shelf at the top of the wedge that is configured to engage the bottom edge of the respective locking plate to which it mates, at least temporarily locking the latch and making it more difficult to disengage for an unwanted intruder seeking to enter a classroom.

8 Claims, 25 Drawing Sheets

(56) References Cited

U.S. PATENT DOCUMENTS

| | | | | |
|---|---|---|---|---|
| 5,454,610 | A * | 10/1995 | Taylor | E05C 17/54 292/339 |
| 5,501,493 | A * | 3/1996 | Arthur | E05C 19/18 292/288 |
| 5,556,143 | A * | 9/1996 | Robinson | E05C 19/184 292/259 R |
| 5,623,841 | A * | 4/1997 | Deemar | E05C 19/182 292/288 |
| 5,711,555 | A * | 1/1998 | Leedy | E05C 19/184 292/205 |
| 6,036,242 | A * | 3/2000 | Lin | E05C 19/182 292/288 |
| 6,340,185 | B1 * | 1/2002 | Truong | E05C 17/50 292/262 |
| 6,609,739 | B1 * | 8/2003 | Avganim | E05C 19/184 70/2 |
| 8,215,140 | B1 * | 7/2012 | Gaines | E05B 17/005 292/338 |
| 8,550,509 | B1 * | 10/2013 | Krotzer | B60J 1/20 292/342 |
| 8,894,110 | B2 | 11/2014 | Taylor | |
| 9,534,430 | B2 | 1/2017 | Taylor | |
| 9,546,506 | B1 * | 1/2017 | Kangatharalingam | E05C 19/184 |
| 9,546,507 | B2 * | 1/2017 | Letson | E05C 17/047 |
| 9,957,741 | B2 | 5/2018 | Taylor | |
| 10,689,890 | B2 * | 6/2020 | Taylor | E05C 19/184 |
| 10,822,849 | B1 * | 11/2020 | Musgrave | E05C 19/003 |
| 10,876,330 | B1 * | 12/2020 | Anderson | E05C 17/025 |
| 10,883,297 | B1 * | 1/2021 | Seise | E05F 5/06 |
| 11,414,906 | B1 * | 8/2022 | Tallent | E05D 11/1007 |
| 2002/0067046 | A1 * | 6/2002 | Cox, Sr. | E05C 19/184 292/289 |
| 2002/0088255 | A1 * | 7/2002 | Moores | E05C 19/003 70/164 |
| 2008/0087053 | A1 * | 4/2008 | Frazier | E05C 7/04 70/95 |
| 2009/0160200 | A1 * | 6/2009 | Greenway | E05C 7/04 292/268 |
| 2015/0000354 | A1 * | 1/2015 | Orlov | E05C 17/54 70/14 |
| 2018/0128025 | A1 * | 5/2018 | Estrada | E05C 17/56 |
| 2018/0128027 | A1 * | 5/2018 | Seamans | E05C 17/54 |
| 2018/0371810 | A1 * | 12/2018 | Howard | E05C 1/04 |
| 2019/0284854 | A1 * | 9/2019 | Geenens | E05B 45/06 |
| 2021/0032904 | A1 * | 2/2021 | Silvani, Jr. | E05C 19/003 |
| 2021/0087851 | A1 * | 3/2021 | Trout | E05B 47/0001 |
| 2021/0254375 | A1 * | 8/2021 | Lewis | E05C 19/003 |
| 2022/0136295 | A1 * | 5/2022 | Gizas | E05C 19/003 292/259 R |
| 2022/0333414 | A1 * | 10/2022 | Smith, III | E05C 19/184 |
| 2023/0147265 | A1 * | 5/2023 | Reger | E05C 5/00 70/91 |
| 2023/0184014 | A1 * | 6/2023 | Zeppetelli | E05C 19/184 292/258 |

* cited by examiner

LOCKING DEVICE

BACKGROUND OF THE INVENTION

Technical Field

The invention(s) disclosed herein relate generally to locks, and more specifically, to a locking device having a non-tethered latch with a plurality of elongate shafts configured for the insertion and removal into a corresponding plurality of lock plates for securing a door.

Description of Related Art

Violence perpetrated by both students and non-students within schools continues to increase over time. Such school violence sometimes takes the form of mass shootings involving one or more shooters who are able to cause significant death and injury in a short amount of time before law enforcement is able to effectively respond. School administrators, teachers, school board members, parents, and law enforcement, among others, continue to search for robust solutions to eliminate or at least significantly reduce the risk of harm that accompanies such school shootings and other forms of school violence.

One effective means for reducing the risk of harm associated with school violence is to employ devices for locking or otherwise securing doors to classrooms and other rooms within a school. However, utilizing traditional types of prior art locks on doors within a school is not always easily achievable, and even if it is, does not always yield the most optimal results. For example, retrofitting classroom doors with traditional deadbolt locks is often cost-prohibitive as doing so requires significant modifications to both doors, walls, and doorframes. Further, utilizing prior art locking systems within classrooms can be impractical in that many such locking systems, such as deadbolts and knob locks, can provide students and other persons with the ability to lock classroom doors from within the classroom, allowing students the opportunity to lock teachers outside of the classroom. In such prior art locking systems, utilizing latching structures that are connected to or otherwise tethered to the door, students have the ability to lock and unlock the door with relative ease. In other prior art locking systems, featuring non-tethered latches, the latches can be easily removed, often by a simple lifting movement. This ease of removal of the latch can be a disadvantage when a locking system is utilized in a school environment, as some measure of difficulty in unlocking a classroom door is desired to slow down or inhibit the ability of a violent perpetrator to open such a door.

Therefore, what is needed is a door locking device utilizing a non-tethered latch for securing a door, allowing a teacher to have the ability to maintain control over the ability to lock and unlock a door. What is also needed is a door locking device that can be operated from inside a classroom or other school room. What is also needed is a door locking device having a latch with structures that enhance the difficulty of removing the latch so as to unlock a classroom door or other school door. These and other needs are met by the embodiments of the novel locking device described below with reference to the accompanying drawings.

BRIEF DESCRIPTION OF THE SEVERAL VIEWS OF THE DRAWINGS

The invention(s) will be more fully understood by reference to the following detailed description of the preferred and alternate embodiments when read in conjunction with the accompanying drawings, wherein.

Figure 1:
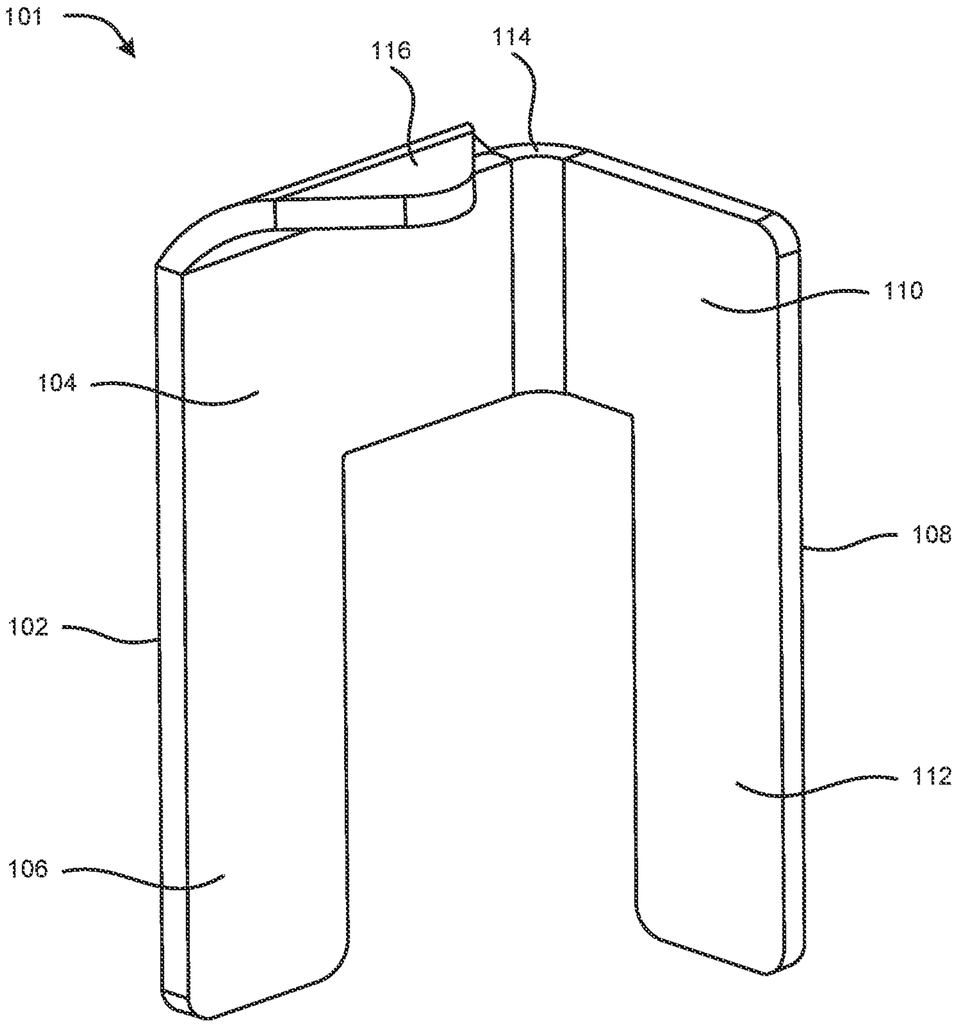
FIG. 1 is a front perspective view of an embodiment of a latch of the locking device in accordance with aspects of the present disclosure.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the inventions disclosed herein have been read and understood.

DETAILED DESCRIPTION OF EMBODIMENTS OF THE INVENTION

Several exemplary embodiments of the claimed invention(s) will now be described with reference to the drawings. Unless otherwise noted, like elements will be identified by identical numbers throughout all figures. The invention(s) illustratively disclosed herein suitably may be practiced in the absence of any element that is not specifically disclosed herein. The following description is not to be taken in a limiting sense, but is made merely for the purpose of describing the general principles of exemplary embodiments. The scope of the invention(s) should be determined with reference to the claims. Reference throughout this specification to "one embodiment," "an embodiment," or similar language means that a particular feature, structure, or characteristic described in connection with the embodiment is included in at least one embodiment of the inventions disclosed herein. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments. In the following description, numerous specific details are provided, such as examples of device structures, methods of use of the devices, etc., to provide a thorough understanding of embodiments of the invention(s). One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention(s).

Novel locking devices, and methods of use thereof, are disclosed herein. It should be noted that while the exemplary embodiments of the invention(s) as described herein are primarily configured for use with doors used in school classrooms and other doors within a school environment, the same principles discussed herein could be implemented in connection with doors outside of schools, such as in connection with doors in public spaces, offices, hospitals, community living centers, businesses, etc. Indeed, it is contemplated that the locking devices, and methods of use taught herein, could be utilized to secure doors, hatches, portals, and other entryway structures without limitation.

Referring now to FIG. 1, shown is a front perspective view of an embodiment of a latch of the locking device in accordance with aspects of the present disclosure. In one embodiment, the latch (101) is removable and has a first top lateral body (104) from which a first vertical elongate shaft (102) extends in a downward direction therefrom, said latch (101) having a second top lateral body (110) from which a second vertical elongate shaft (108) extends in a downward direction therefrom. In one embodiment, the first top lateral body (104) is connected to, and positioned substantially perpendicular to, said second top lateral body (110). In one embodiment, a middle top lateral body (114) of said latch (101) is positioned intermediate said first top lateral body (104) and said second top lateral body (110), said middle top lateral body being curved or arch shaped so as to connect the first and second top lateral bodies which are substantially perpendicular to one another. In alternate embodiments of the locking device, it is contemplated that the first and second top lateral bodies of the latch may be oriented to one another in angles other than perpendicular, and may even be configured so as to lay on the same plane so as to be substantially flat (for example, see alternate embodiment of a latch depicted in FIG. 20). In one embodiment of the latch, a curved handle (116) of said latch protrudes in an upward and forward direction from at least a first top side of said first top lateral body. In other alternate embodiments, a curved handle may protrude from a second top side of said second top lateral body, and in other alternate embodiments, from the top sides of both the first and second top lateral bodies, respectively. The direction the handle protrudes from the top of the latch may vary in alternate embodiments. Moreover, while the handle of the embodiments of the latch depicted herein are curved, alternate embodiments of the latch may have a non-curved handle—for example, a handle that protrudes from the top of the latch at a right angle from plane of the first top lateral body.

Figure 8:
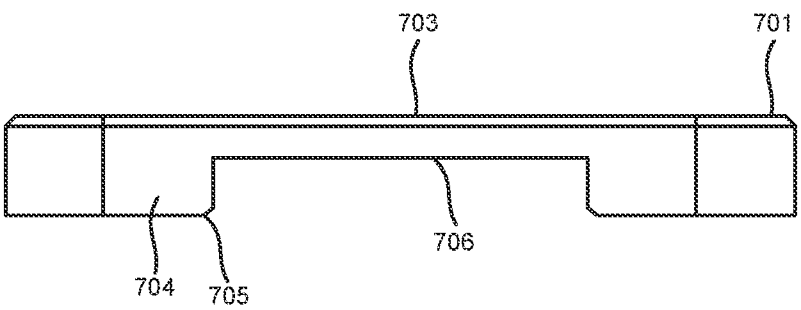
FIG. 8 is a top view of the embodiment of a lock plate of the locking device depicted in FIG. 7.
Figure 9:
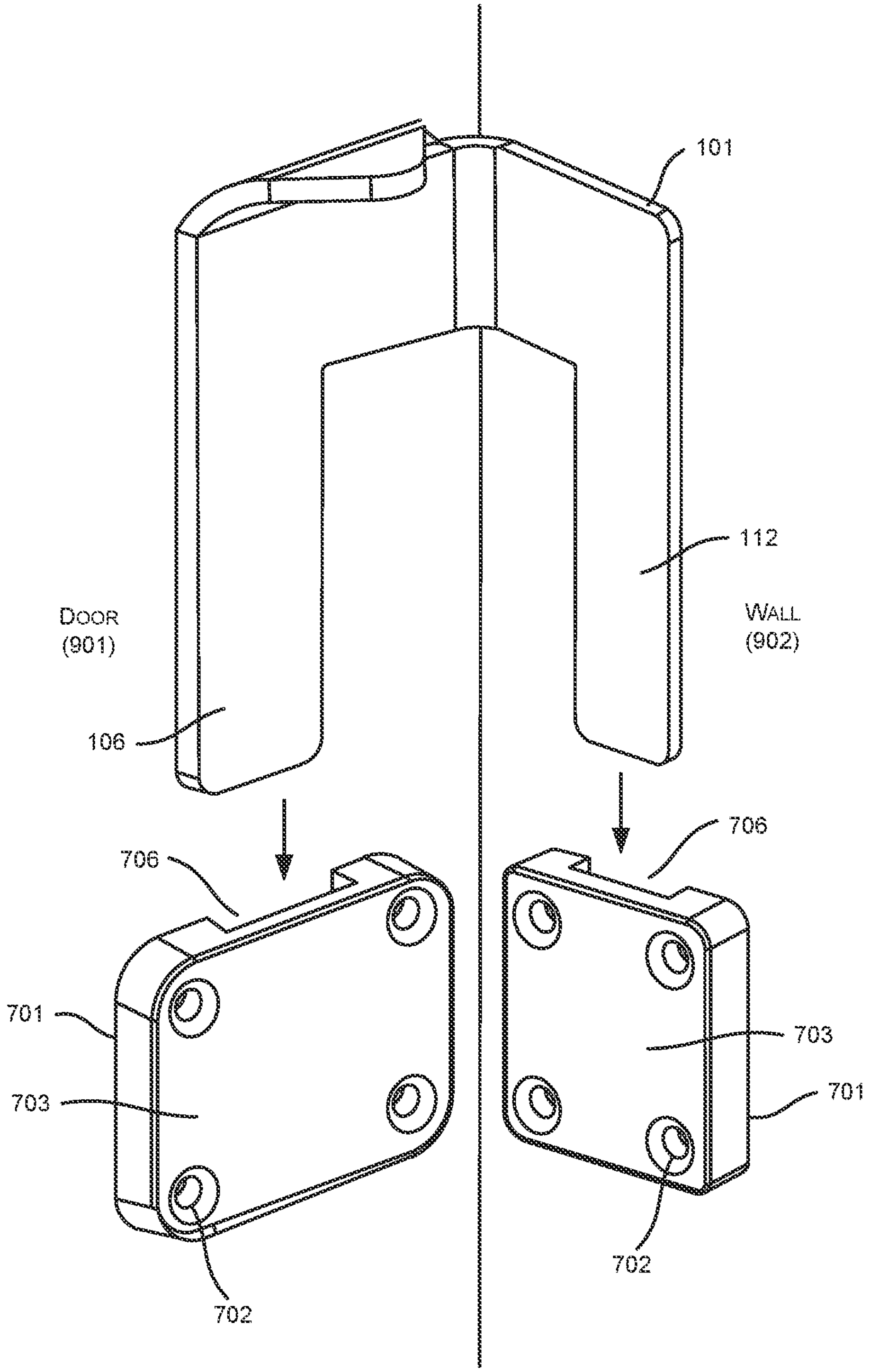
FIG. 9 is a front perspective view of the embodiment of the latch depicted in FIGS. 1-6, positioned to engage with a plurality of lock plates according to the embodiments depicted in FIGS. 7-9, said lock plates being mounted to a door and wall, respectively.
Figure 10:
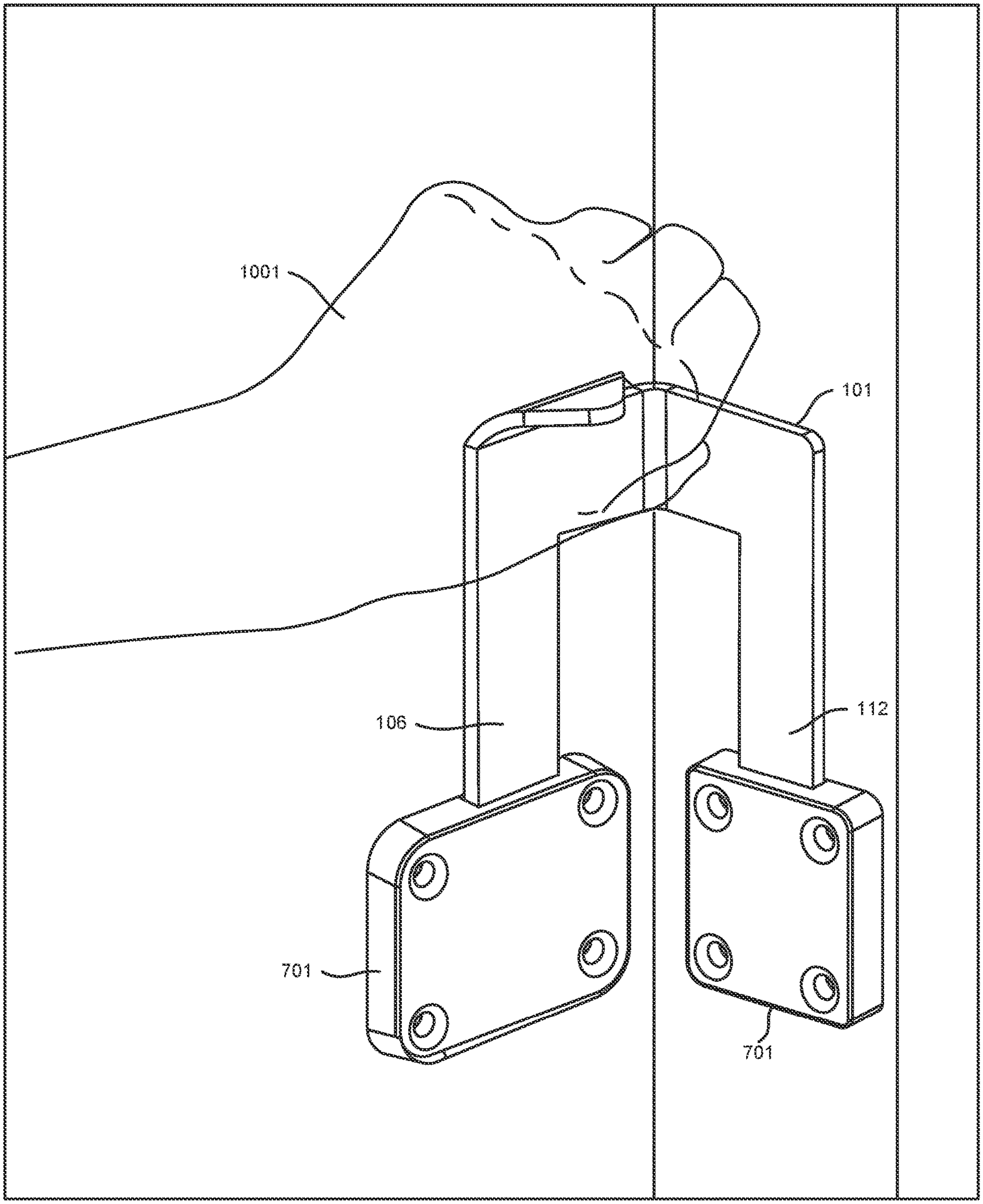
FIG. 10 is a front perspective view of the embodiment of the latch depicted in FIG. 9, being moved by a user to insert within, and partially engaged with, the plurality of lock plates depicted in FIG. 9.

Still referring to FIG. 1, in one embodiment of the locking device (101), a first lower end (106) of the first vertical elongate shaft (102) is sized and shaped to mate with a first aperture/channel of a first lock plate, and a second lower end (112) of the second vertical elongate shaft (108) is sized and shaped to mate with a second aperture/channel of said second lock plate (see FIGS. 8-10). In one embodiment, the latch is neither tethered to the first lock plate or the second lock plate, nor a door, door frame, or wall. The latch is preferably constructed of steel, but may in alternate embodiments be constructed of all manner of metals, metal alloys, polymers, and biologic materials. It should further be noted that the proportions of the latch and lock plates illustrated in the figures shown herein are merely exemplary in nature, and that it is contemplated that such latch and lock plate structures may have other proportions and shapes than that which is illustrated.

Figure 2:
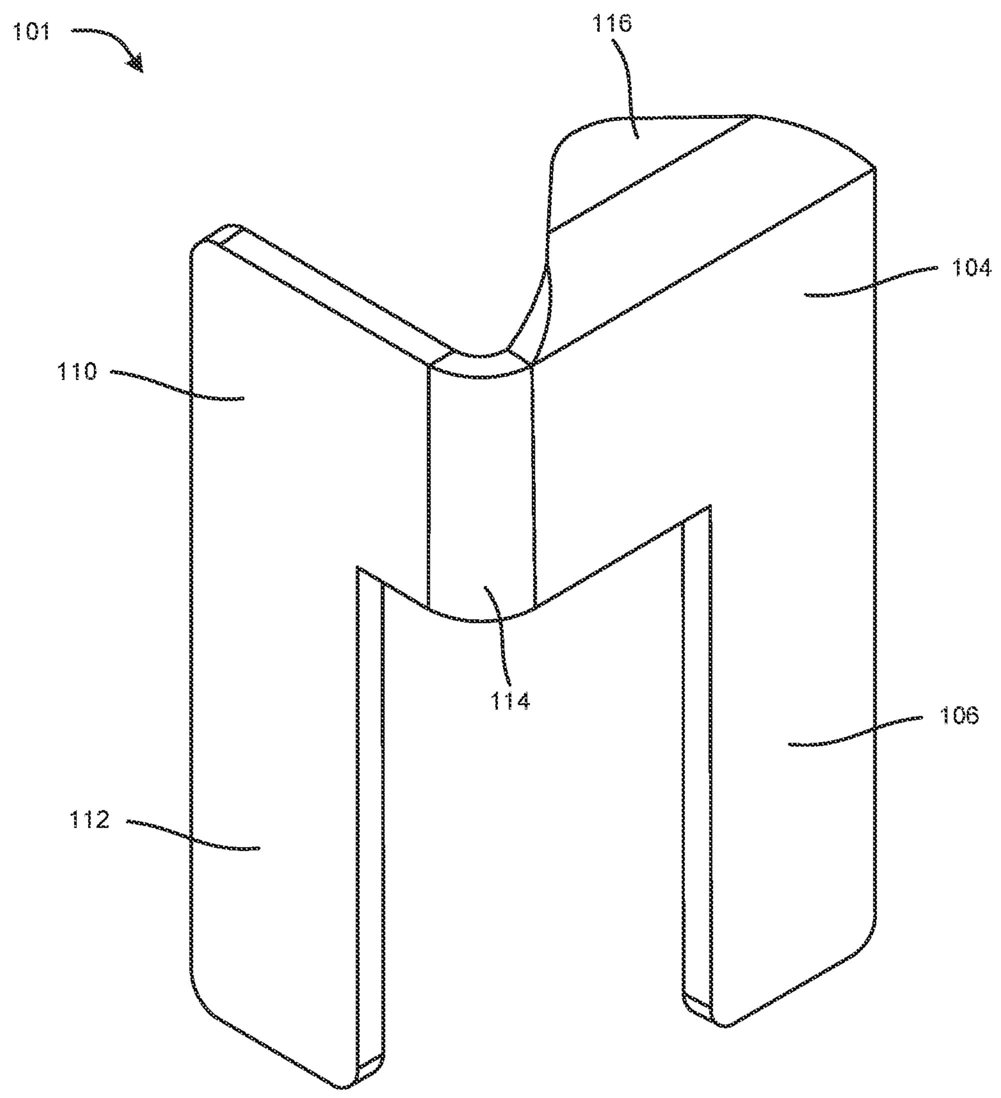
FIG. 2 is a back perspective view of the embodiment of the latch of the locking device depicted in FIG. 1.

Referring now to FIG. 2, shown is a back perspective view of the embodiment of the latch (101) of the locking device depicted in FIG. 1. In one embodiment, the first top lateral body (104) of said removable latch has a first surface area that is larger than a second surface area of said second top lateral body (110) of said removable latch. The top lateral body having the largest surface area is preferably positioned for mating with a lock plate mounted to a door, and the curved handle (116) is preferably formed on a top side of said larger top lateral body. However, alternate embodiments of the latch may be constructed such that the curved handle is formed on a top side of a top lateral body configured to be positioned against a wall or door frame. In some alternate embodiments, the first and second top lateral bodies may have equal or substantially equal surface areas.

Figure 3:
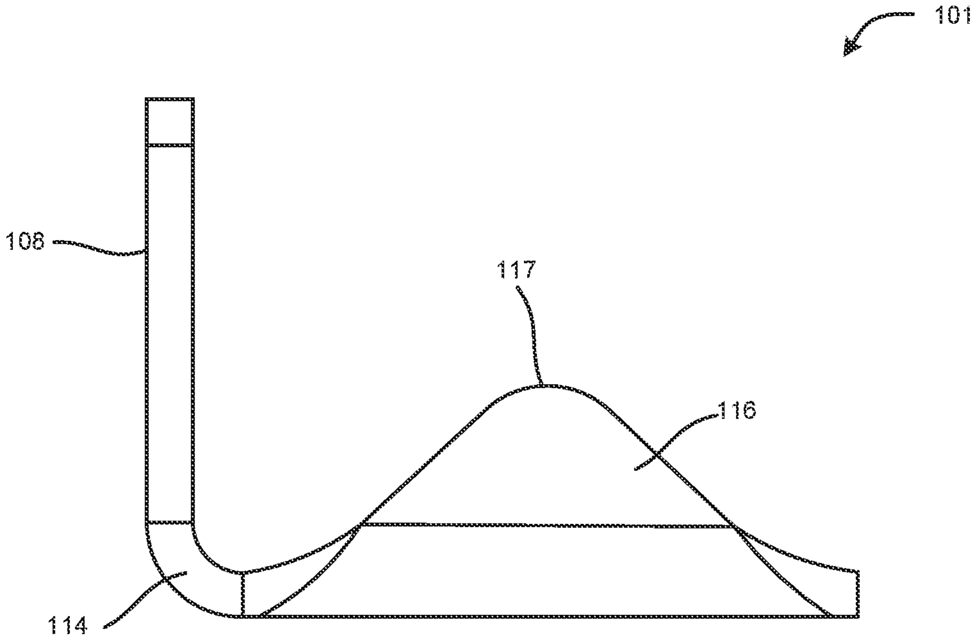
FIG. 3 is a top view of the embodiment of the latch of the locking device depicted in FIG. 1.

Referring now to FIG. 3, shown is a top view of the embodiment of the latch (101) of the locking device depicted in FIG. 1. In one embodiment, the curved handle (116) is formed or attached to a top side of a first top lateral body of the latch (101). In one embodiment, the curved handle (116) extends in a forward direction from the front of the first lateral body, and tapers to a blunted point (117). The blunted tapered point (117) serves as a lip under which a user's finger or hand can be placed under to lift the latch out of the locking plates. Other alternate embodiments of the handle may have other shapes and not be curved.

Figure 4:
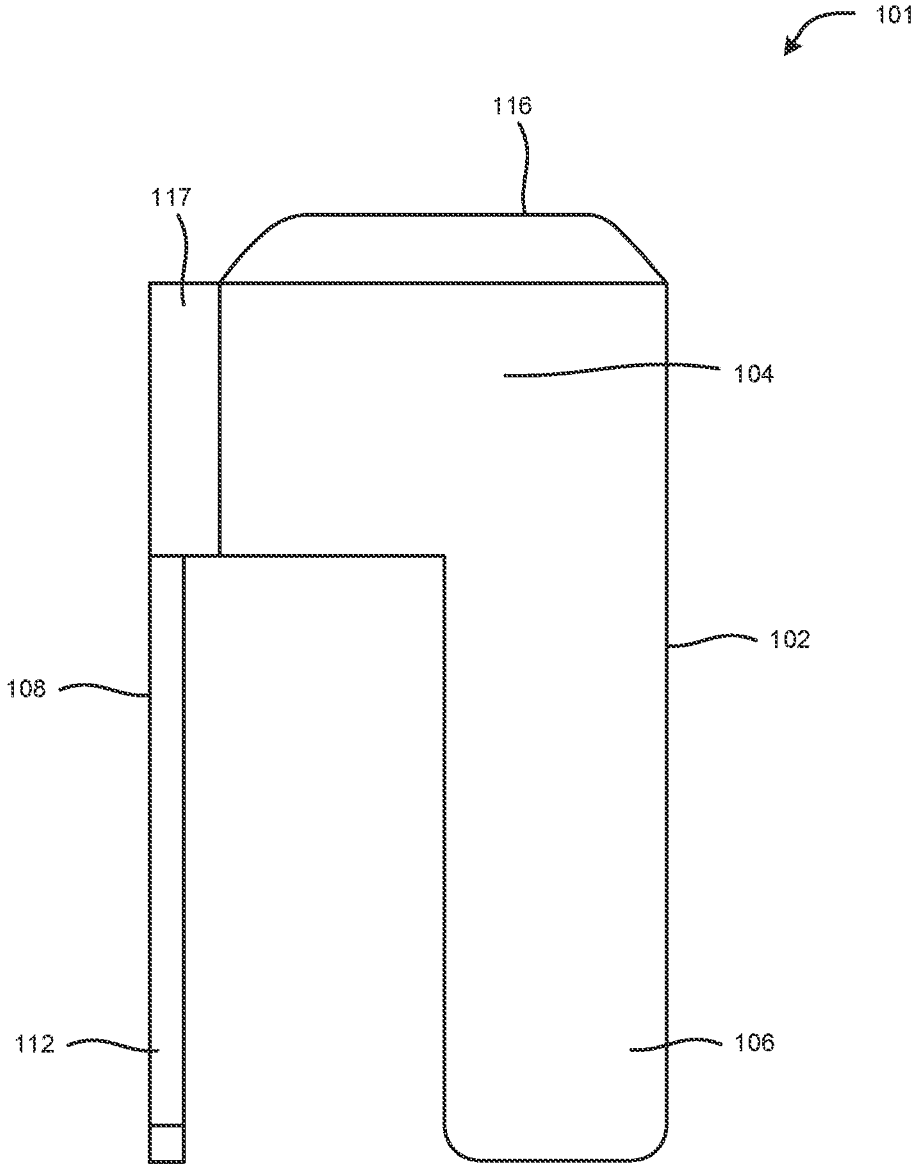
FIG. 4 is a back view of the embodiment of the latch of the locking device depicted in FIG. 1.

Referring now to FIG. 4, shown is a back view of the embodiment of the latch (101) of the locking device depicted in FIG. 1, viewed from the back side of the first top lateral body (104) of the latch. In one embodiment, both the first lower end (106) of the first vertical elongate shaft (102), and the second lower end (112) of the first vertical elongate shaft (108) have cross sections that are rectangular. However, it is contemplated that other alternate embodiments of the latch may have lower ends of its vertical elongate shafts that are shaped in alternate ways, such as shafts with circular, oval, triangular, and irregular shaped in their respective cross sections. Indeed, in other alternate embodiments, the lower ends of the shafts may be shaped in distinct patterns so as to be keyed to correspondingly shaped apertures/channels formed in the respective locking plates to which they are intended to mate.

Figure 5:
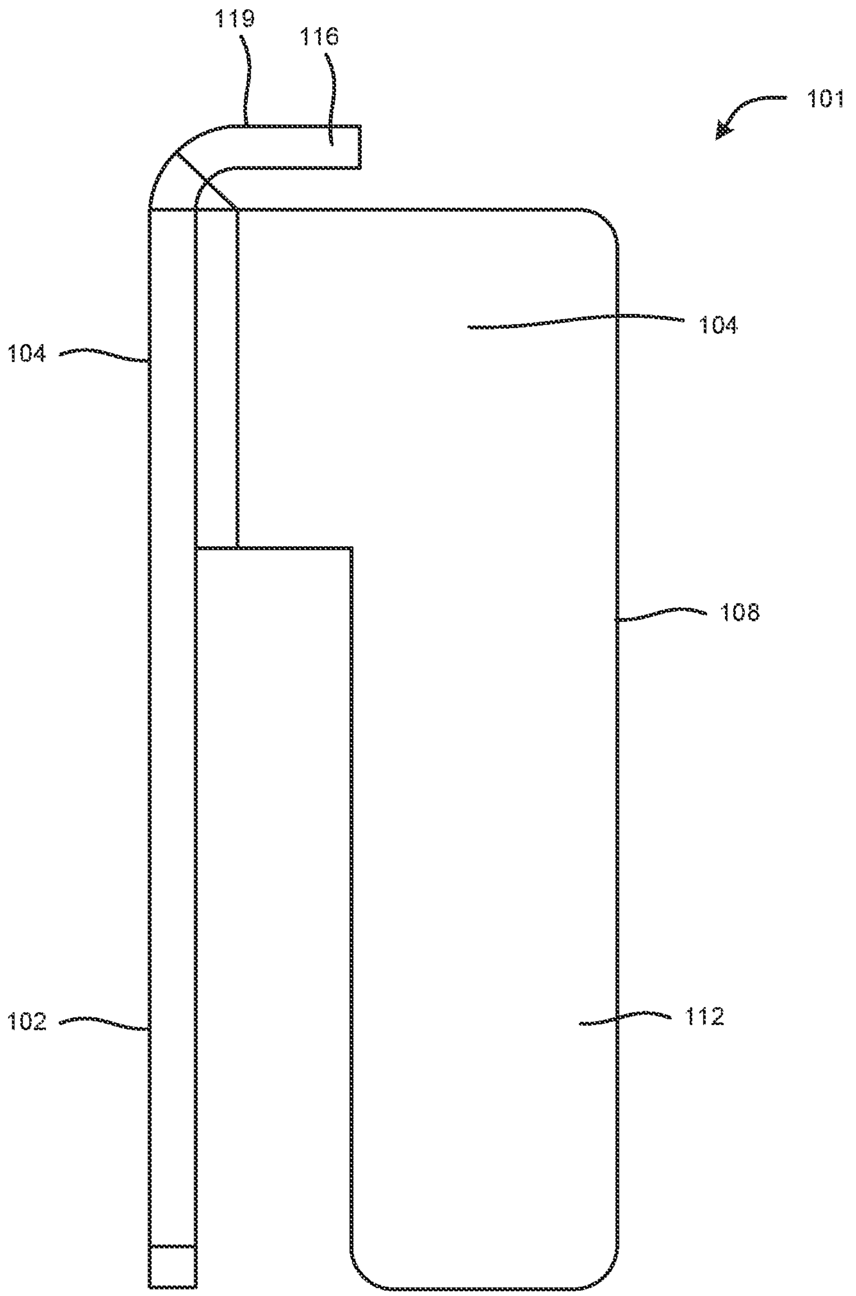
FIG. 5 is a side view of the embodiment of the latch of the locking device depicted in FIG. 1.

Referring now to FIG. 5, shown is a side view of the embodiment of the latch of the locking device depicted in FIG. 1. In one embodiment, a top side (119) of the curved handle (116) is substantially perpendicular to the back side of the first top lateral portion (104) of the latch (101). In alternate embodiments of the latch, the curved handle (116) may be positioned on the latch so as to have other angles with respect to the top lateral sides of the latch. It should further be understood that while the top lateral portions of the latch depicted herein are generally rectangular in shape, and have rounded corners, alternate embodiments of the latch may include top lateral portions having other shapes and having corners more or less rounded.

Figure 6:
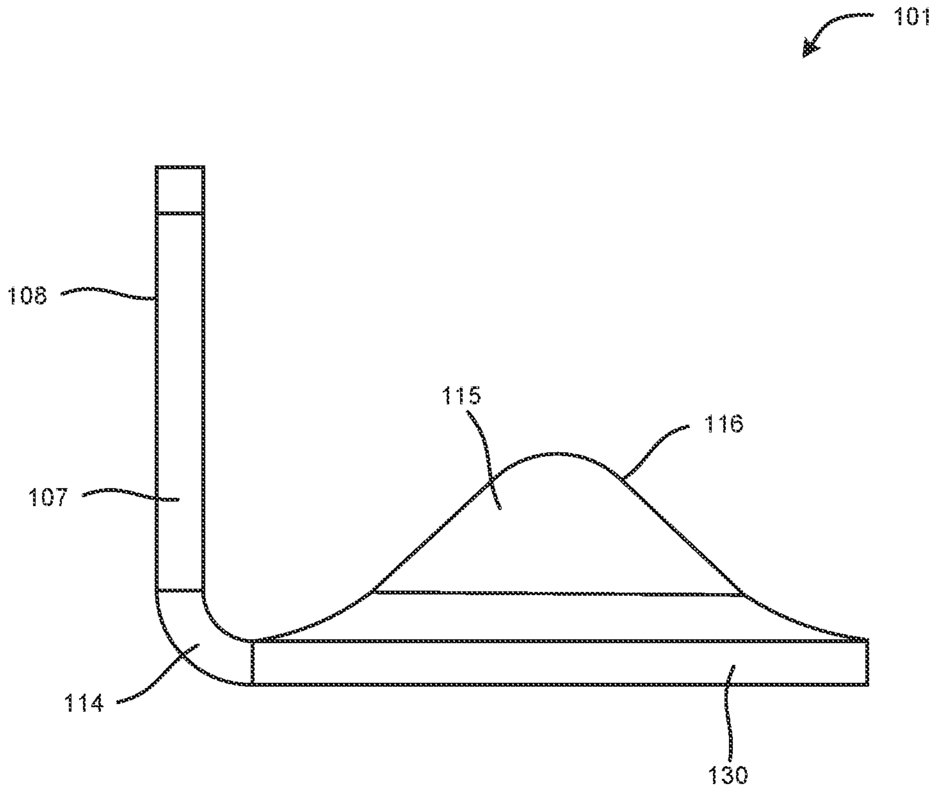
FIG. 6 is a bottom view of the embodiment of the latch of the locking device depicted in FIG. 1.

Referring now to FIG. 6, shown is a bottom view of the embodiment of the latch of the locking device depicted in FIG. 1. A first bottom side (103) of said first elongate shaft (102), and a second bottom side (107) of said second elongate shaft (108) are substantially flat in one embodiment. However, in alternate embodiments, such first and second bottom sides of the elongate shafts may be rounded, tapered, triangular, or have other shapes. In other alternate embodiments, the bottom side (115) of the curved handle (116) may have a textured surface formed thereon so as to allow a user to more easily grasp the handle.

Figure 7:
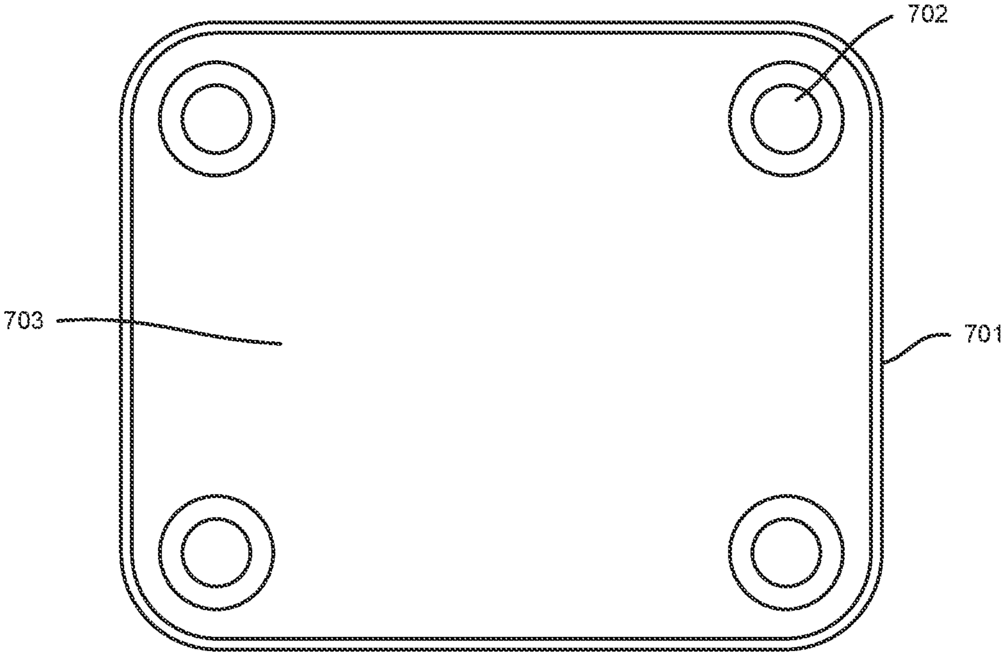
FIG. 7 is a front view of an embodiment of a lock plate of the locking device in accordance with aspects of the present disclosure.

Referring now to FIG. 7, shown is a front view of an embodiment of a lock plate (701) of the locking device in accordance with aspects of the present disclosure. In one embodiment, the lock plate has a front side (703), back side (not shown), two lateral sides (not shown), a top side (see FIG. 8 at 704), and a bottom side (not shown). In one embodiment, the lock plate is substantially rectangular in shape, having rounded corners. One or more fasteners (702) are configured to engage the lock plate through holes formed through the lock plate, so as to be mounted on surfaces such as a door, wall, door frame, or other surface upon which the lock plate is to be mounted. In one embodiment, the one or more fasteners may be screws for mounting objects onto wood, metal, concrete, or other mounting surfaces. In alternate embodiments, the fasteners may be other types of fasteners such as bolts. In even other alternate embodiments, the lock plates may be mounted to a mounting surface using adhesives, or a combination or adhesives and fasteners.

Referring now to FIG. 8, shown is a top view of the embodiment of a lock plate of the locking device depicted in FIG. 7. On a top side (704) of a lock plate (701), a channel or other aperture (706) may be formed completely or at least partially through the back side (705) of the lock plate. In one embodiment, the back side (705) of the lock plate is configured, when the lock plate is mounted to a door, wall, door frame, or other mounting surface, to rest on such mounting surface. The channel or aperture (706) formed on the back side (705) of the lock plate is sized and shaped to receive a correspondingly sized and shaped first lower end (106) of the first vertical elongate shaft (102) or correspondingly sized and shaped second lower end (112) of the second vertical elongate shaft (108). In other alternate embodiments, the inner surfaces of the apertures/channels may be shaped in distinct patterns so as to be keyed to correspondingly shaped lower ends of the respective vertical elongate shafts to which they are intended to receive and mate.

Referring now to FIG. 9, shown a front perspective view of the embodiment of the latch (101) depicted in FIGS. 1-6, positioned to engage with a plurality of lock plates (701) according to the embodiments depicted in FIGS. 7-9, said lock plates being mounted to a door (901) and wall (902), respectively. A user may position the latch above the top sides of the lock plates such that the latch is oriented in a substantially vertical position with the lower ends (106, 112) of the vertical elongate shafts positioned just above the respective aperture/channel (706) of the locking plates, ready to slide the latch in a downward motion into the apertures/channels of the locking plates so as to mate the latch with the respective locking plates mounted on the door (901) and wall (902) or door frame adjacent to the door.

Referring now to FIG. 10, shown is a front perspective view of the embodiment of the latch (101) depicted in FIG. 9, being moved by a user (1001) to insert within, and partially engaged with, the plurality of lock plates (701) depicted in FIG. 9. Once the lower portions (106, 112) of the vertical elongate shafts of the latch are inserted into the apertures/channels on the top sides of the respective lock plates, a user may slide the latch further downward into the lock plates.

Figure 11:
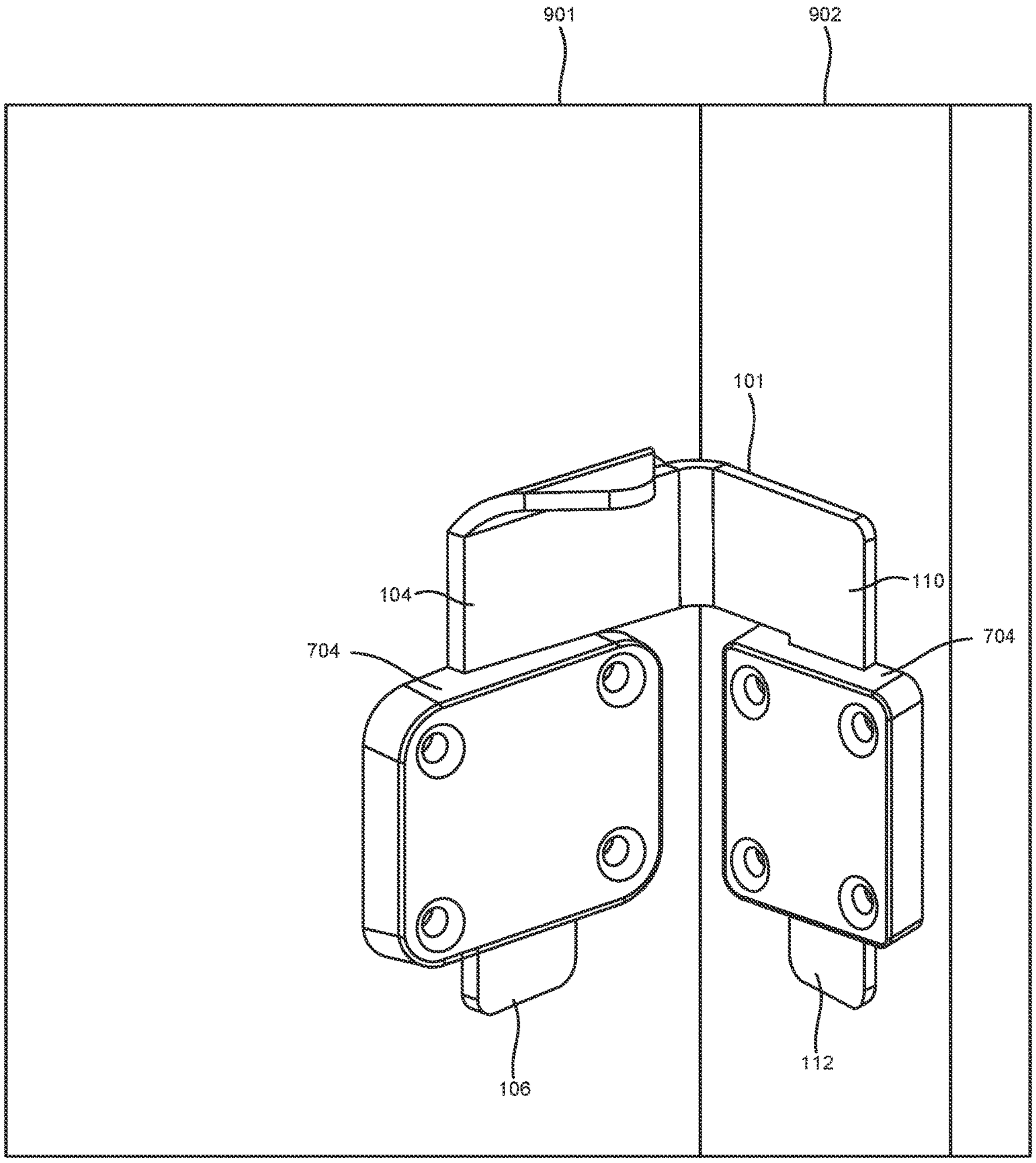
FIG. 11 is a front perspective view of the embodiment of the latch depicted in FIG. 9, inserted within, and fully engaged with, the plurality of lock plates depicted in FIG. 9.

Referring now to FIG. 11, shown is a front perspective view of the embodiment of the latch (101) depicted in FIG. 9, inserted within, and fully engaged with, the plurality of lock plates depicted in FIG. 9. As the latch slides lower into the lock plates, the bottoms of the first and second top lateral portions will abut the top sides (704) of the respective lock plates, halting further downward travel of the latch. In one embodiment, apertures/channels formed on the back sides of the lock plates extend through the entire lock plate, top side to bottom side, such that there is a bottom opening of such aperture/channel formed on the bottom side of the lock plates. At least part of the lower portions of the vertical elongate shafts may protrude through such respective bottom openings of the lock plates as depicted in FIG. 11. Once the latch is mated with the respective lock plates mounted onto the door and wall (or door frame) adjacent to the door, the locking device prevents the door from opening. A user must lift the latch in an upward direction, preferably using the curved handle, to disengage the latch from the lock plates so as to enable the door to be opened.

Figure 12:
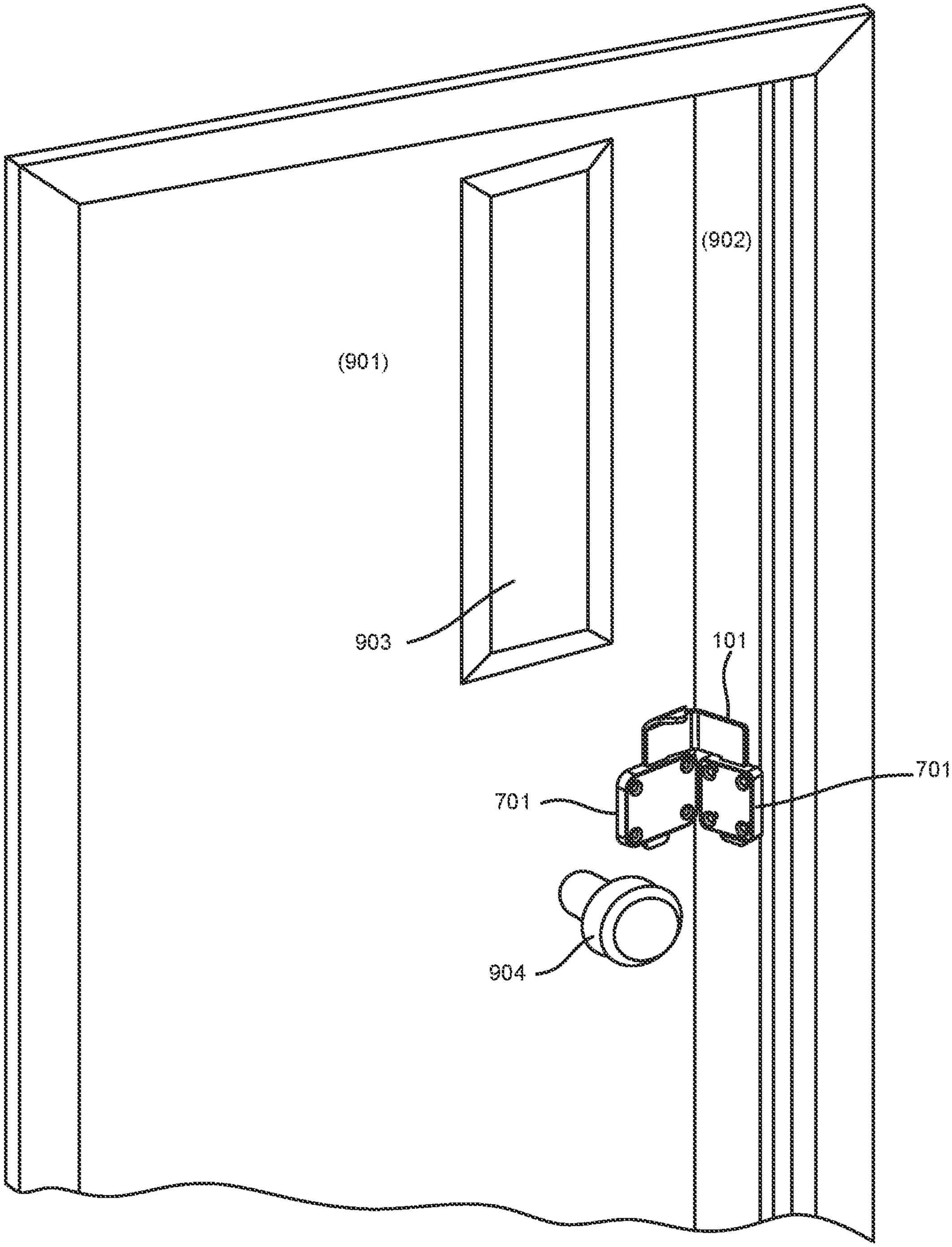
FIG. 12 is a front perspective view of the embodiment of the latch depicted in FIG. 9, inserted within, and fully engaged with, the plurality of lock plates depicted in FIG. 9, said plurality of lock plates being mounted on a door and wall, respectively.

Referring now to FIG. 12, shown is a front perspective view of the embodiment of the latch (101) depicted in FIG. 9, inserted within, and fully engaged with, the plurality of lock plates (701) depicted in FIG. 9, said plurality of lock plates being mounted on a door (901) and wall/doorframe (902), respectively. In one embodiment, the locking device may be mounted on the door/doorframe at a location adjacent to a door knob (904), but preferably far enough away from any window (902) formed in the door that would allow an unwanted intruder to easily manipulate the lift the latch from the lock plates. In one embodiment, no part of the latch is tethered or otherwise permanently attached to the lock plates, door, or wall/doorframe. This non-tethered or attached nature of the latch of the locking device provides an advantage over prior art locking devices in that access to the means for locking a door, namely a latch, can be controlled by a teacher or some other person in authority such that students or other non-authorized persons cannot lock a classroom door. For example, this configuration would prevent a scenario in which a teacher who may need to temporarily step into a hallway, is not locked out of their class by students or other persons. Another advantage the locking device of the present invention has over prior art locking devices is that it utilizes a plurality of locking plates, at least one of which is mountable on a wall or door frame. Some prior art locking devices must engage door frame structures without the use of a lock plate, resulting in a latch that is less able to secure a door to prevent opening, and requires that a door frame have specifically shaped structures to permit operation of the locking device.

Figure 13:
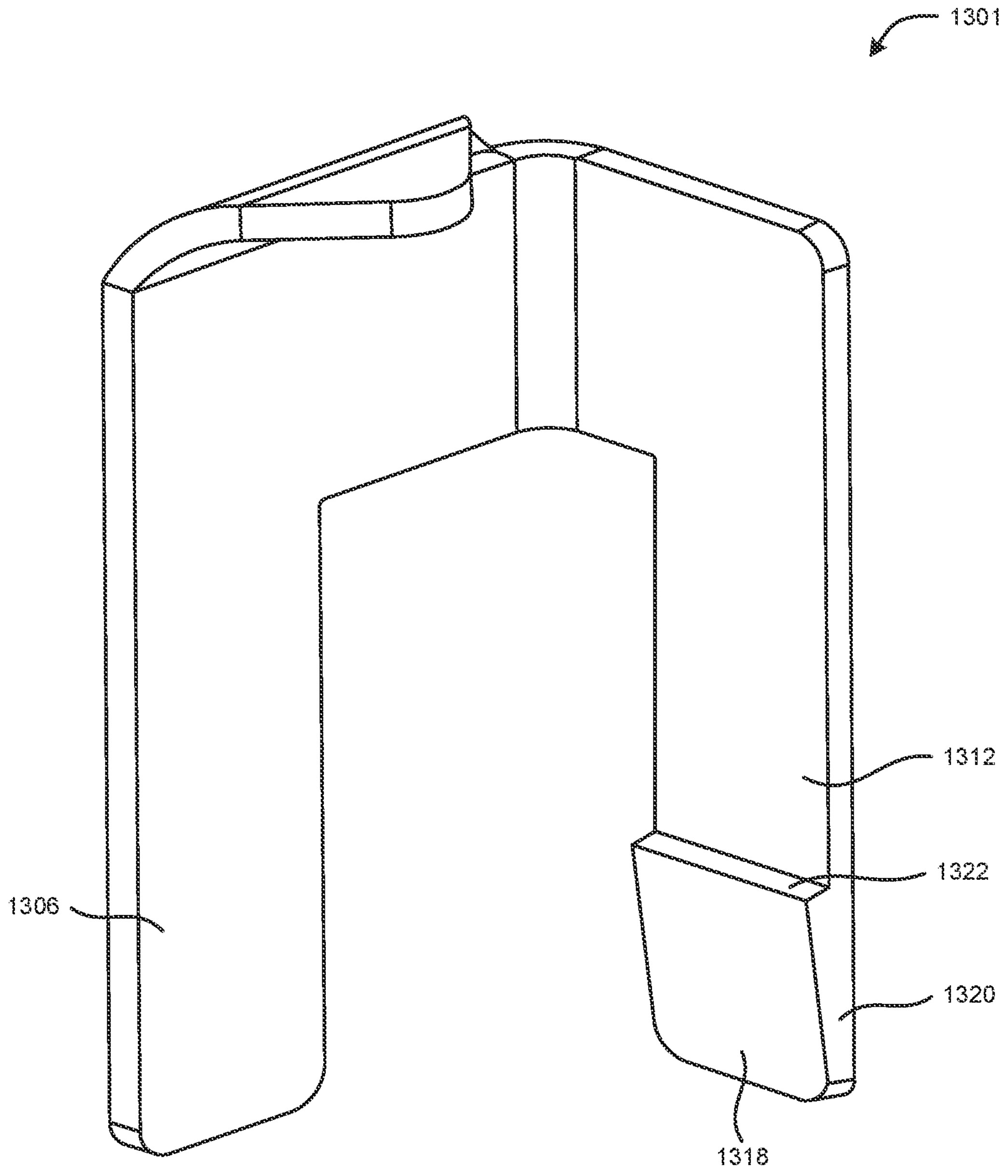
FIG. 13 is a front perspective view of an alternate embodiment of a latch of the locking device in accordance with aspects of the present disclosure.

Referring now to FIG. 13, shown is a front perspective view of an alternate embodiment of a removable latch (1301) of the locking device in accordance with aspects of the present disclosure. In one embodiment, a first lower end (1312) of the second vertical elongate shaft is wedge shaped. A front side (1318) of the wedge shaped first lower end (1312) increases in thickness from a bottom end to a shelf (1322) that protrudes from the front side of the first lower end. A side (1320) of the wedge-shaped lower end tapers in increasing thickness from the bottom side to the shelf. The wedge-shaped lower end of this alternate embodiment provides an advantage over other locking devices of the prior art utilizing latches in that such wedge shape works to engage with a lower end of a lock plate when the latch fully mates with such lock plate. In this alternate embodiment, at least the lower end of the vertical elongate shaft is constructed of a material that is flexible such as, for example, metals or polymers that allow such lower end to flex with the application of force by a user's hand. When the alternate embodiment of the latch fully engages the lock plates, the wedge-shaped lower end protrudes from the bottom opening of the lock plate to which it has mated until the shelf (1322) engages the bottom edge of the lock plate. This engagement prevents the latch plate from being easily disengaged from the lock plate, as the shelf works to halt upward movement of the latch. However, the flexible nature of the lower end of the vertical elongate shaft allows a user to apply force to the front side (1318) of the wedge shaped first lower end (1312) to disengage the shelf from the bottom edge of the lock plate, thus allowing the latch to be removed from the lock plate. This provides another advantage of this alternate embodiment of the locking device over prior art locking devices. Namely, this complicates the removal of the latch from the lock plates, especially for someone such as an intruder who is not accustomed to having to manipulate such a latch to open a door. This complication in removing the latch, afforded by the lower end of the elongate shaft having a wedge shape and a shelf, may result in an intruder being unable to open a door, or at least further delay their ability to do so, giving more time for law enforcement to arrive and/or teachers and students to escape or take protective measures.

Figure 14:
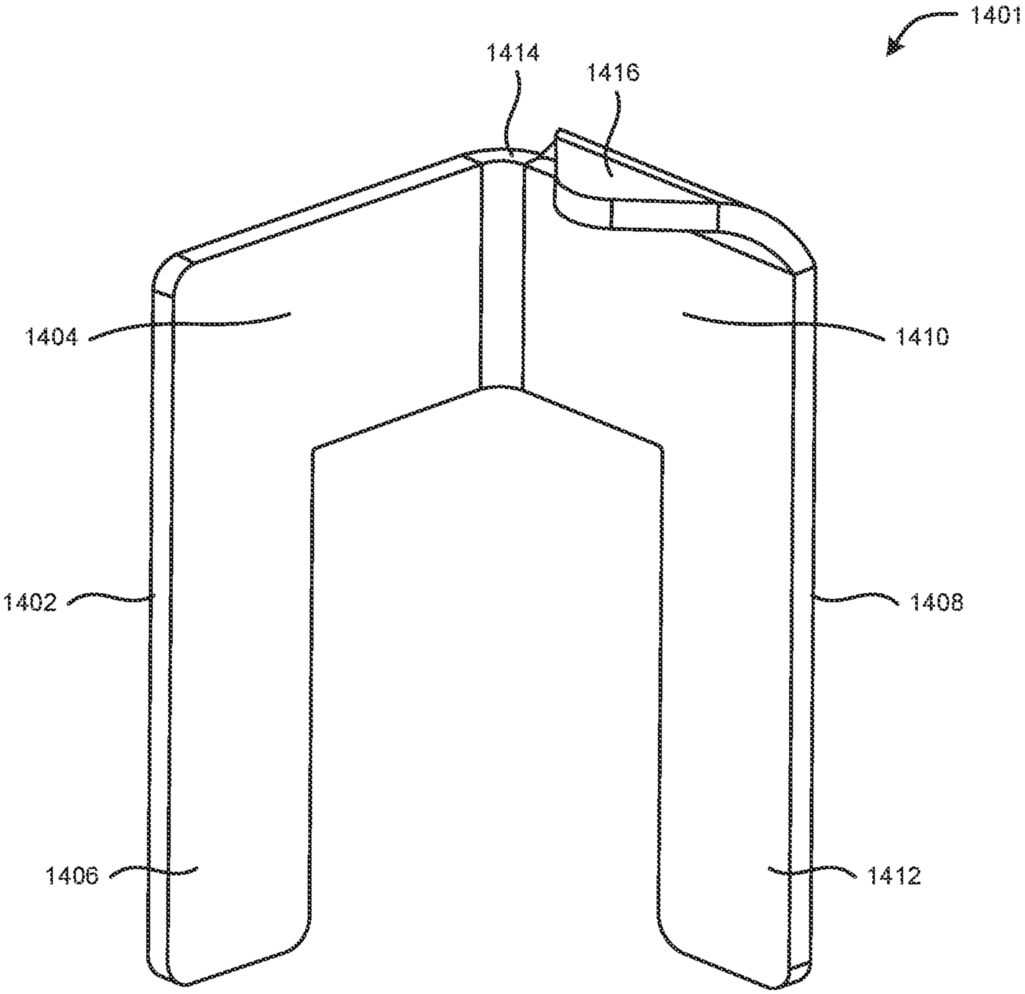
FIG. 14 is a front perspective view of an alternate embodiment of a latch of the locking device in accordance with aspects of the present disclosure.

Referring now to FIG. 14, shown is a front perspective view of an alternate embodiment of a latch (1401) of the locking device in accordance with aspects of the present disclosure. It should be noted that the alternate embodiments of the latch depicted in FIGS. 14-19 are in most respects identical to the embodiment of the latch depicted in FIGS. 1-12, except the latch has been modified (curved handle is mounted on top side of second top lateral portion of latch) for mounting to a door configured to open from a left side (as viewed from the interior of a classroom). In one embodiment, the latch (1401) is removable and has a first top lateral body (1404) from which a first vertical elongate shaft (1402) extends in a downward direction therefrom, said latch (1401) having a second top lateral body (1410) from which a second vertical elongate shaft (1408) extends in a downward direction therefrom. In one embodiment, the first top lateral body (1404) is connected to, and positioned substantially perpendicular to, said second top lateral body (1410). In one embodiment, a middle top lateral body (1414) of said latch (1401) is positioned intermediate said first top lateral body (1404) and said second top lateral body (1410), said middle top lateral body being curved or arch shaped so as to connect the first and second top lateral bodies which are substantially perpendicular to one another. In alternate embodiments of the locking device, it is contemplated that the first and second top lateral bodies of the latch may be oriented to one another in angles other than perpendicular, and may even be configured so as to lay on the same plane (for example, see alternate embodiment of a latch depicted in FIG. 20). In one embodiment of the latch, a curved handle (1416) of said latch protrudes from at least a second top side of said second top lateral body (1410). The locking device (1401), a first lower end (1406) of the first vertical elongate shaft (1402) is sized and shaped to mate with a first aperture/channel of a first lock plate, and a second lower end (1412) of the second vertical elongate shaft (1408) is sized and shaped to mate with a second aperture/channel of said second lock plate (see FIGS. 8-10).

Figure 15:
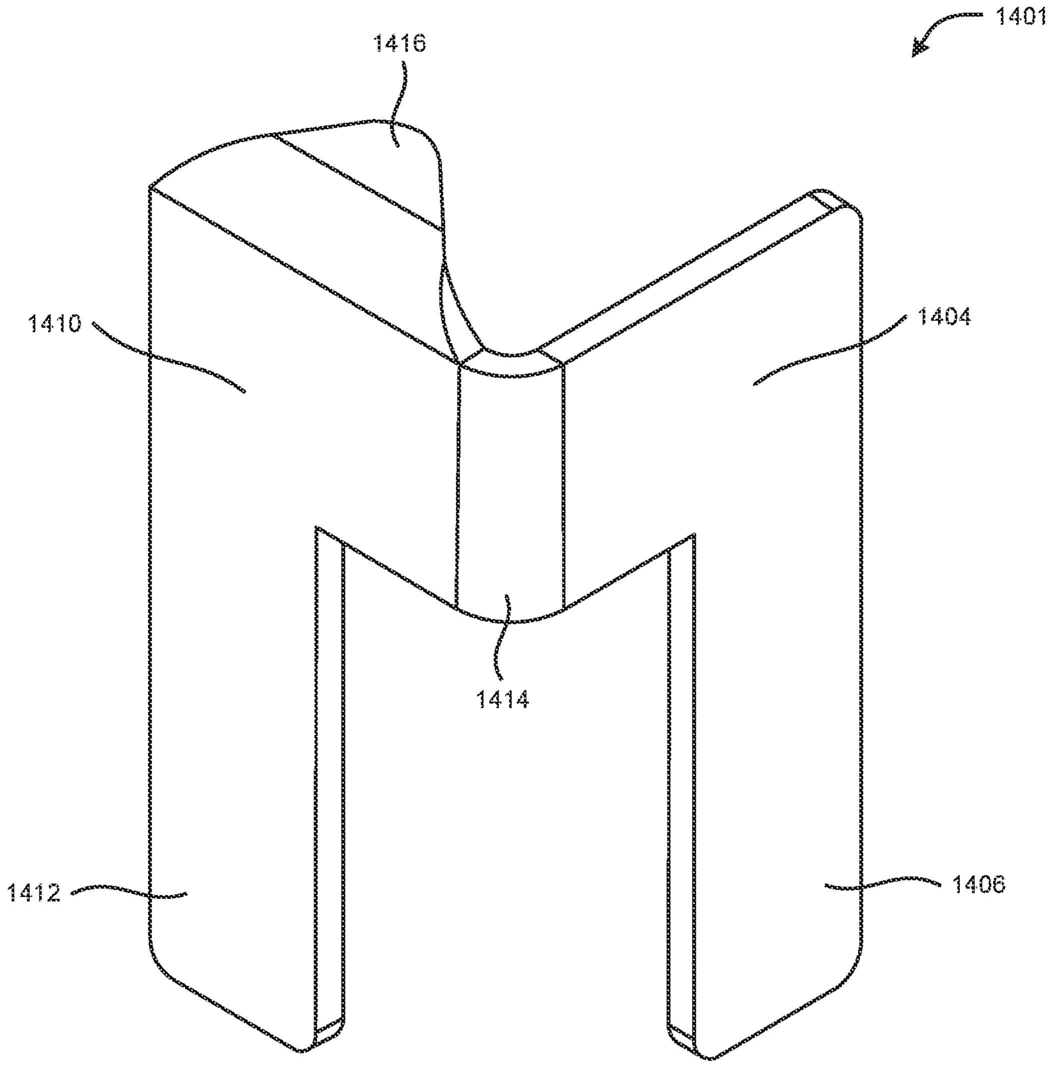
FIG. 15 is a back perspective view of the alternate embodiment of the latch of the locking device depicted in FIG. 14.

Referring now to FIG. 15, shown is a back perspective view of the alternate embodiment of the latch of the locking device depicted in FIG. 14. In one embodiment, the first top lateral body (1404) of said removable latch has a first surface area that is larger than a second surface area of said second top lateral body (1410) of said removable latch. The top lateral body having the largest surface area is preferably positioned for mating with a lock plate mounted to a door, and the curved handle (1416) is preferably formed on a top side of said larger top lateral body. However, alternate embodiments of the latch may be constructed such that the curved handle is formed on a top side of a top lateral body configured to be positioned against a wall or door frame. In some alternate embodiments, the first and second top lateral bodies may have equal or substantially equal surface areas.

Figure 16:
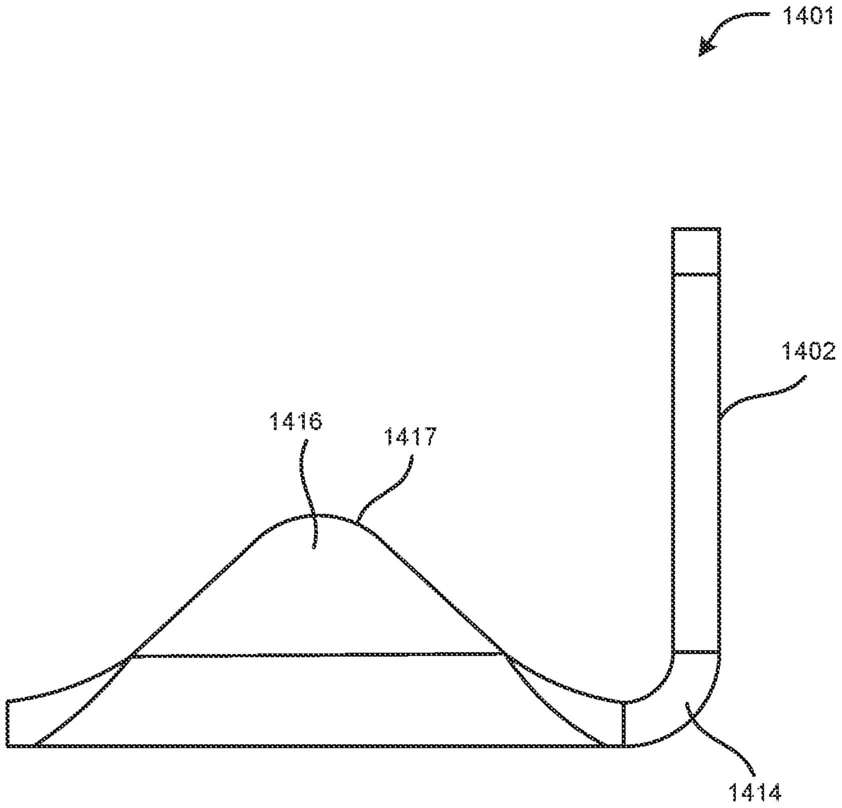
FIG. 16 is a top view of the alternate embodiment of the latch of the locking device depicted in FIG. 14.

Referring now to FIG. 16, shown is a top view of the alternate embodiment of the latch (1401) of the locking device depicted in FIG. 14. In this alternate embodiment, the curved handle (1416) is formed or attached to a top side of a second top lateral body (1410) of the latch (1401). In this embodiment, the curved handle (1416) extends in a forward direction from the front of the second top lateral body, and tapers to a blunted point (1417). The blunted tapered point serves as a lip under which a user's finger or hand can be placed under to lift the latch out of the locking plates. Other alternate embodiments of the handle may have other shapes and not be curved.

Figure 17:
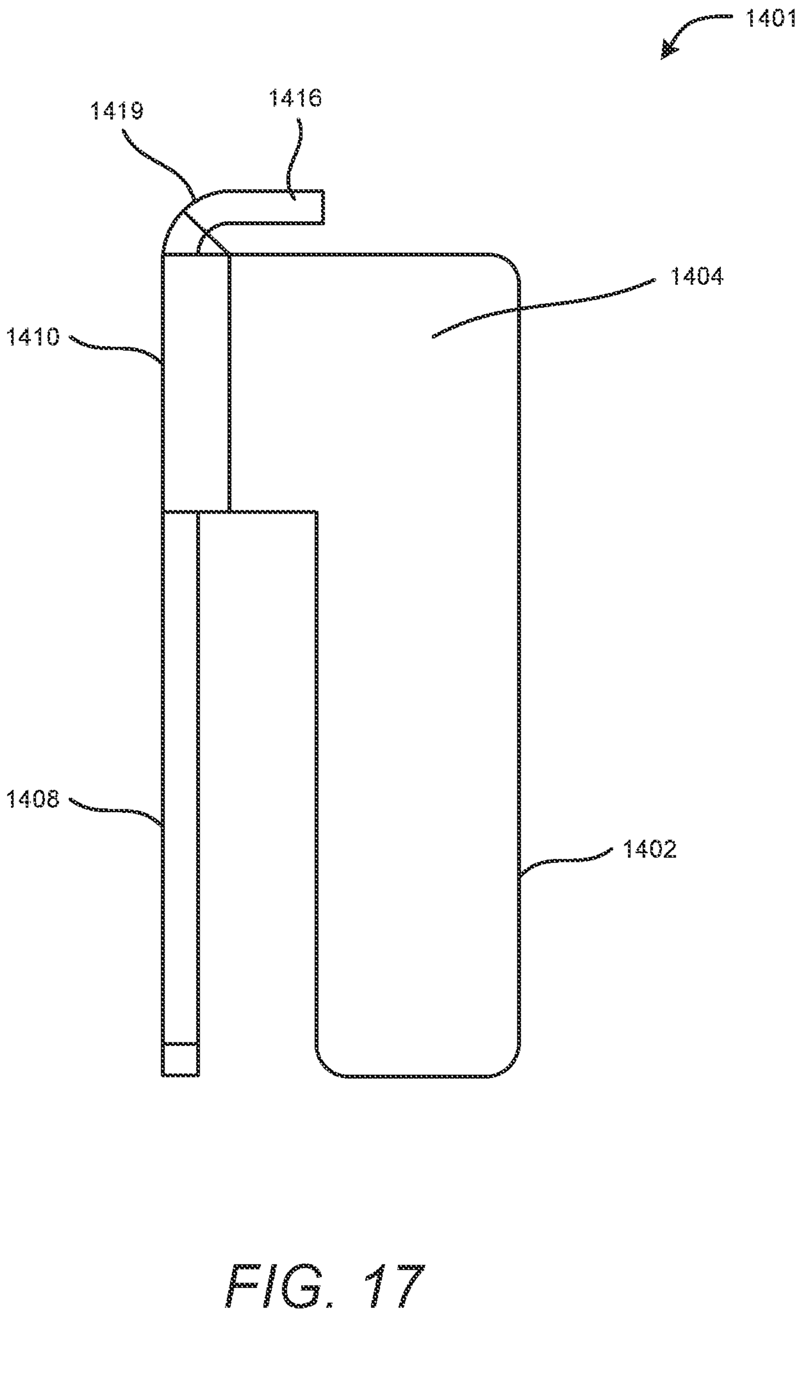
FIG. 17 is a back view of the alternate embodiment of the latch of the locking device depicted in FIG. 14, viewed from the back side of the second top lateral body of the latch.

Referring now to FIG. 17, shown is a back view of the alternate embodiment of the latch of the locking device depicted in FIG. 14, viewed from the back side of the first top lateral body (1404) of the latch (1404). In one embodiment, a top side (1419) of the curved handle (1416) is substantially perpendicular to the back side of the first top lateral portion (1410) of the latch (1401). In alternate embodiments of the latch, the curved handle (1416) may be positioned on the latch so as to have other angles with respect to the top lateral sides of the latch. It should further be understood that while the top lateral portions of the latch depicted herein are generally rectangular in shape, and have rounded corners, alternate embodiments of the latch may include top lateral portions having other shapes and having corners more or less rounded.

Figure 18:
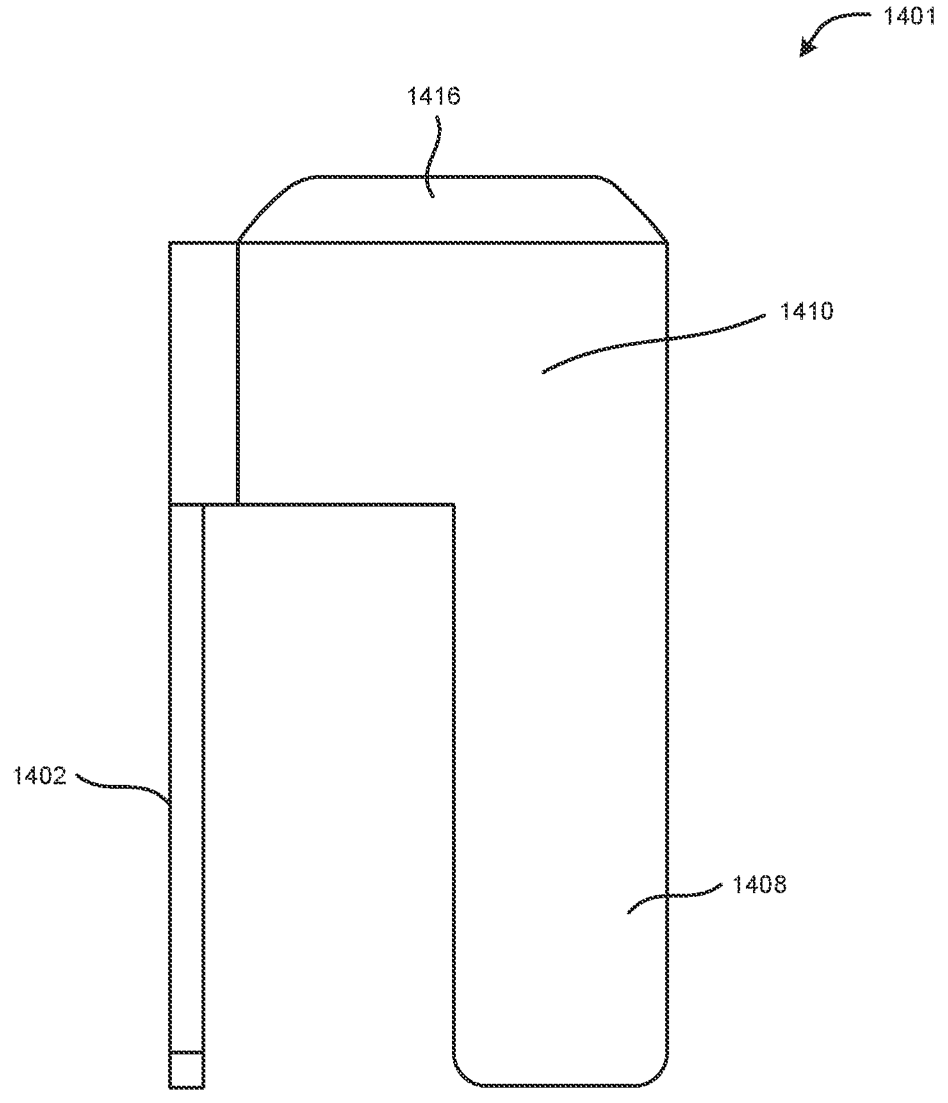
FIG. 18 is a back view of the alternate embodiment of the latch of the locking device depicted in FIG. 14, viewed from the back side of the first top lateral body of the latch.

Referring now to FIG. 18, shown is a back view of the alternate embodiment of the latch (1401) of the locking device depicted in FIG. 14, viewed from the back side of the first top lateral body (1410) of the latch (1404). It should be understood that while the top lateral portions of the latch depicted herein are generally rectangular in shape, and have rounded corners, other alternate embodiments of the latch may include top lateral portions having other shapes and having corners more or less rounded.

Figure 19:
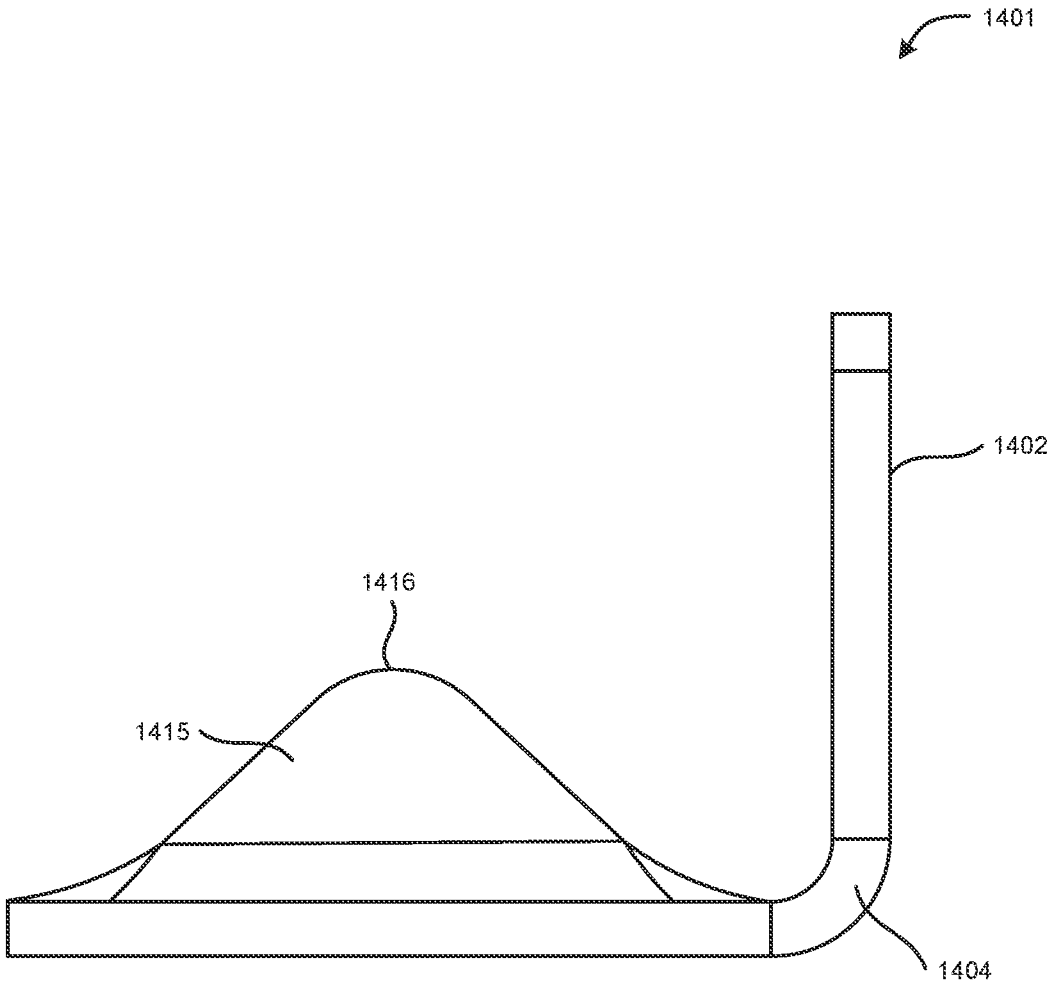
FIG. 19 is a bottom view of the alternate embodiment of the latch of the locking device depicted in FIG. 14.

Referring now to FIG. 19, shown is a bottom view of the alternate embodiment of the latch (1401) of the locking device depicted in FIG. 14. A first bottom side of said first elongate shaft, and a second bottom side of said second elongate shaft are substantially flat in one embodiment. However, in alternate embodiments, such first and second bottom sides of the elongate shafts may be rounded, tapered, triangular, or have other shapes. In other alternate embodiments, the bottom side (1415) of the curved handle (1416) may have a textured surface formed thereon so as to allow a user to more easily grasp the handle.

Figure 20:
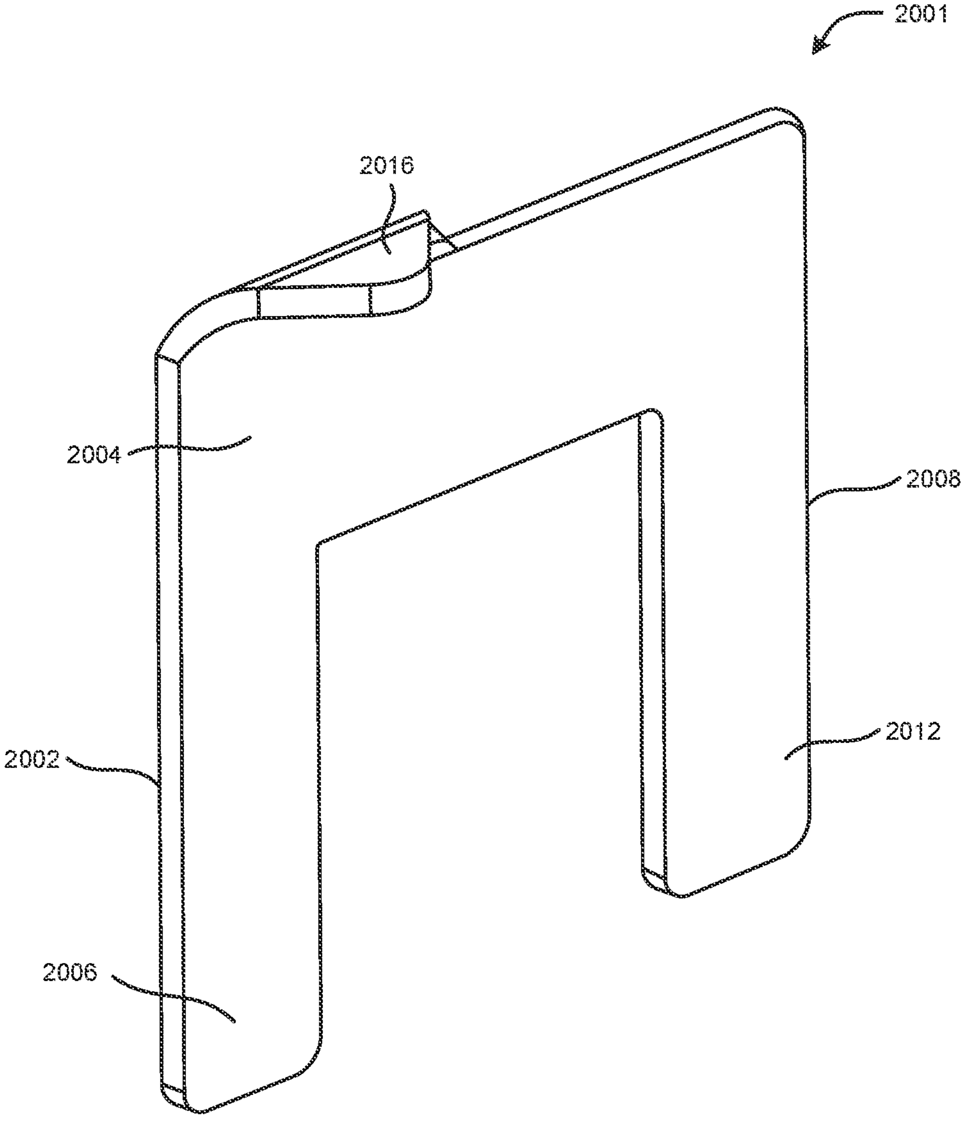
FIG. 20 is a front perspective view of a further alternate embodiment of a latch of the locking device in accordance with aspects of the present disclosure.

Referring now to FIG. 20, shown is a front perspective view of a further alternate embodiment of a latch (2001) of the locking device in accordance with aspects of the present disclosure. In one embodiment, the latch (2001) is removable and has a top lateral body (2004) from which a first vertical elongate shaft (2002) extends in a downward direction therefrom, and a second vertical elongate shaft (2008) extends in a downward direction from the top lateral body (2004). In this alternate embodiment of the latch, the top lateral body is not curved. This alternate embodiment of the latch permits the locking of double doors. A first locking plate is mounted adjacent to an inside edge of a first door, and a second locking plate is mounted adjacent to an inside edge of a second door, the two locking plates mounted in close proximity to one another when the doors are in a closed position. Thus, when the alternate embodiment of the latch depicted in FIG. 20 mates with the two locking plates in close proximity to one another, the latch works to prevent the double doors from opening until the latch is removed. In this alternate embodiment of the latch, a curved handle (2016) of said latch protrudes from a top side of the top lateral body (2004). A first lower end (2006) of the first vertical elongate shaft (2002) is sized and shaped to mate with a first aperture/channel of a first lock plate, and a second lower end (2012) of the second vertical elongate shaft (2008) is sized and shaped to mate with a second aperture/channel of said second lock plate.

Figure 21:
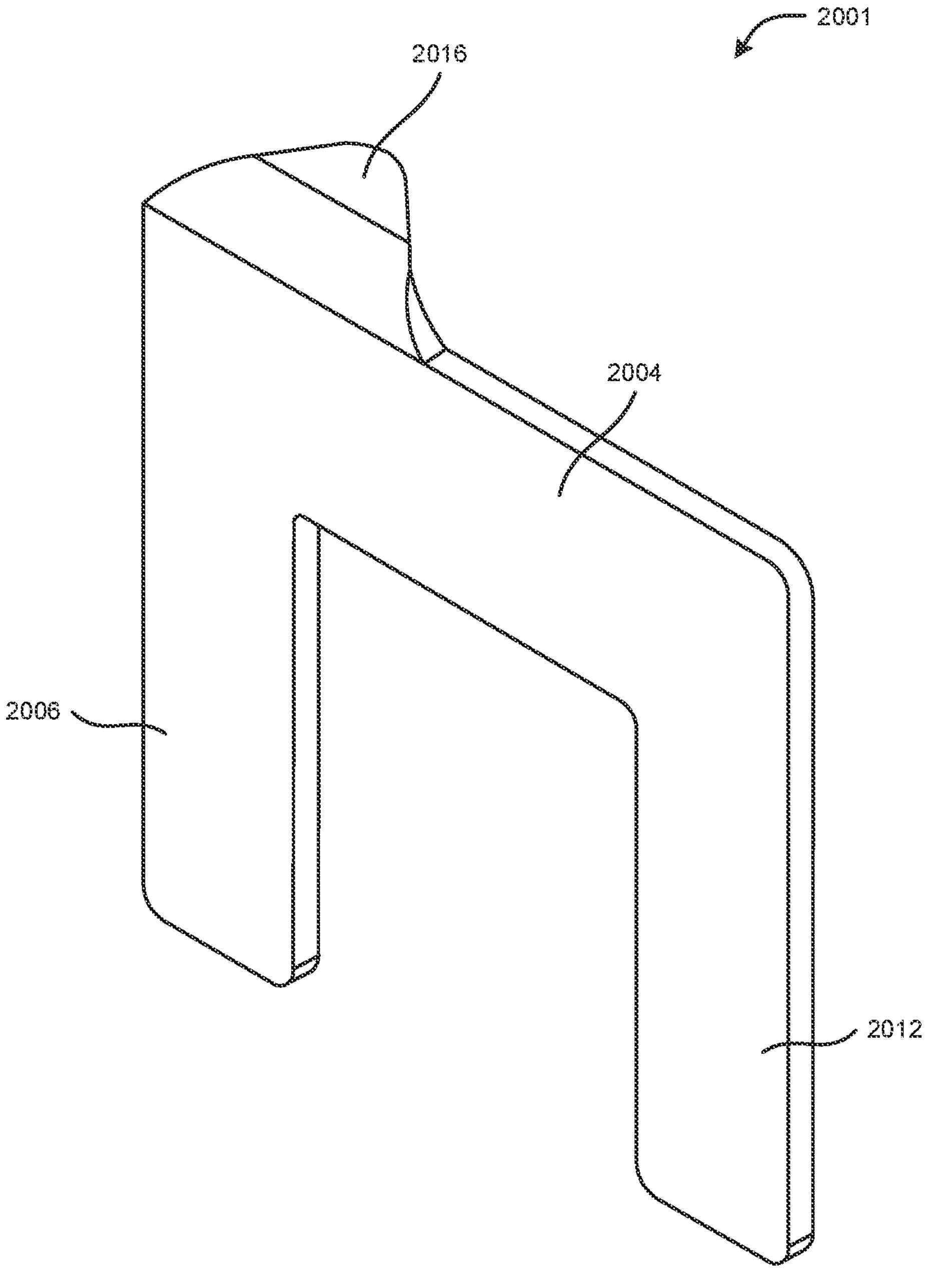
FIG. 21 is a back perspective view of the further alternate embodiment of the latch of the locking device depicted in FIG. 20.

Referring now to FIG. 21, shown is a back perspective view of the further alternate embodiment of the latch of the locking device depicted in FIG. 20.

Figure 22:
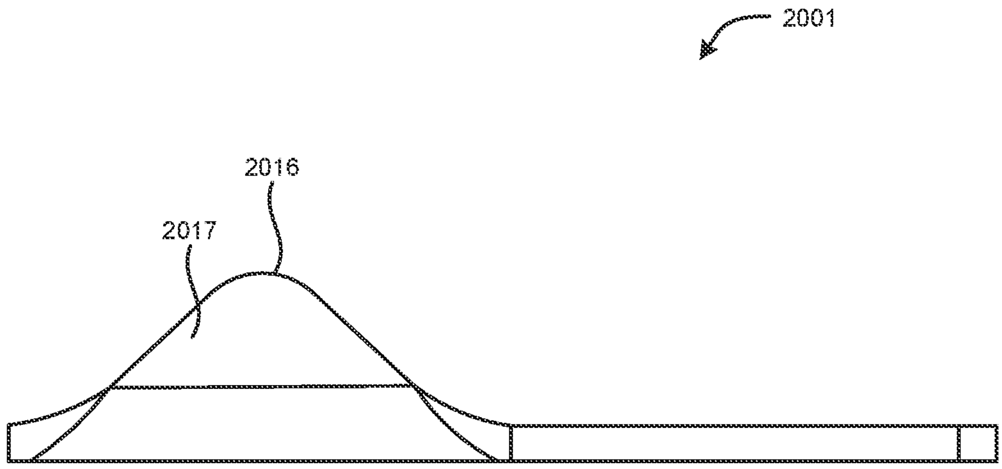
FIG. 22 is a top view of the further alternate embodiment of the latch of the locking device depicted in FIG. 20.

Referring now to FIG. 22, shown is a top view of the further alternate embodiment of the latch of the locking device depicted in FIG. 20. In this alternate embodiment, the curved handle (2016) extends in a forward direction from the front of the top lateral body, and tapers to a blunted point (2017). The blunted tapered point (2017) serves as a lip under which a user's finger or hand can be placed under to lift the latch out of the locking plates. Other alternate embodiments of the handle may have other shapes and not be curved.

Figure 23:
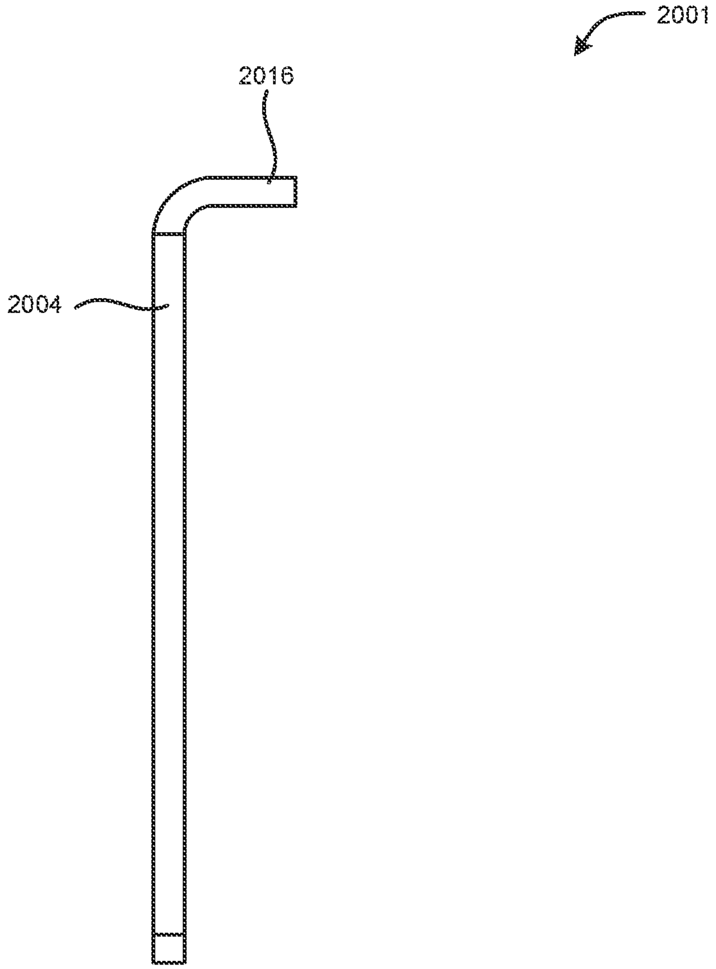
FIG. 23 is a left side view of the further alternate embodiment of the latch of the locking device depicted in FIG. 20.

Referring now to FIG. 23, shown is a left side view of the further alternate embodiment of the latch of the locking device depicted in FIG. 20.

Figure 24:
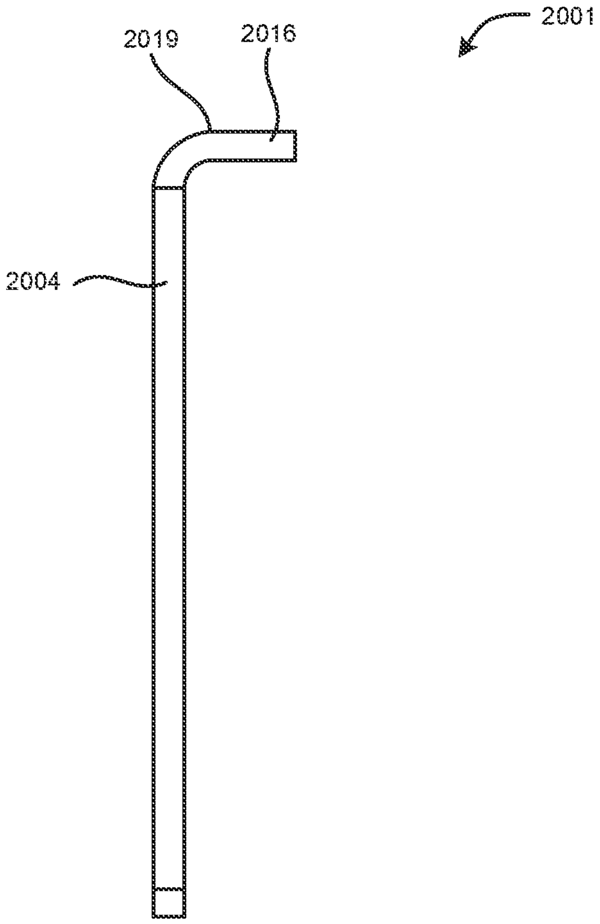
FIG. 24 is a right side view of the further alternate embodiment of the latch of the locking device depicted in FIG. 20.

Referring now to FIG. 24, shown is a right side view of the further alternate embodiment of the latch (2001) of the locking device depicted in FIG. 20. In one embodiment, a top side (2019) of the curved handle (2016) is substantially perpendicular to the back side of the first top lateral portion (2004) of the latch (2001). In alternate embodiments of the latch, the curved handle may be positioned on the latch so as to have other angles with respect to the back side of the top lateral portion of the latch. It should further be understood that while the top lateral portions of the latch depicted herein are generally rectangular in shape, and have rounded corners, alternate embodiments of the latch may include top lateral portions having other shapes and having corners more or less rounded.

Figure 25:
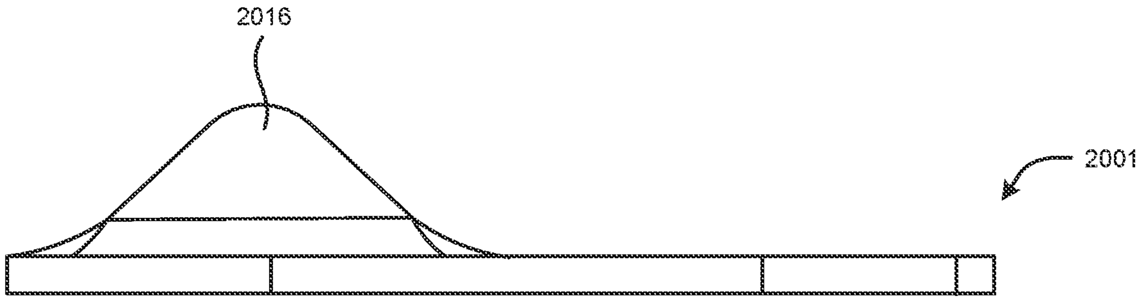
FIG. 25 is a bottom view of the further alternate embodiment of the latch of the locking device depicted in FIG. 20.

Referring now to FIG. 25, shown is a bottom view of the further alternate embodiment of the latch of the locking device depicted in FIG. 20. A first bottom side of said first elongate shaft, and a second bottom side of said second elongate shaft are substantially flat in one embodiment. However, in alternate embodiments, such first and second bottom sides of the elongate shafts may be rounded, tapered, triangular, or have other shapes. In other alternate embodiments, the bottom side of the curved handle may have a textured surface formed thereon so as to allow a user to more easily grasp the handle.

Figure 26:
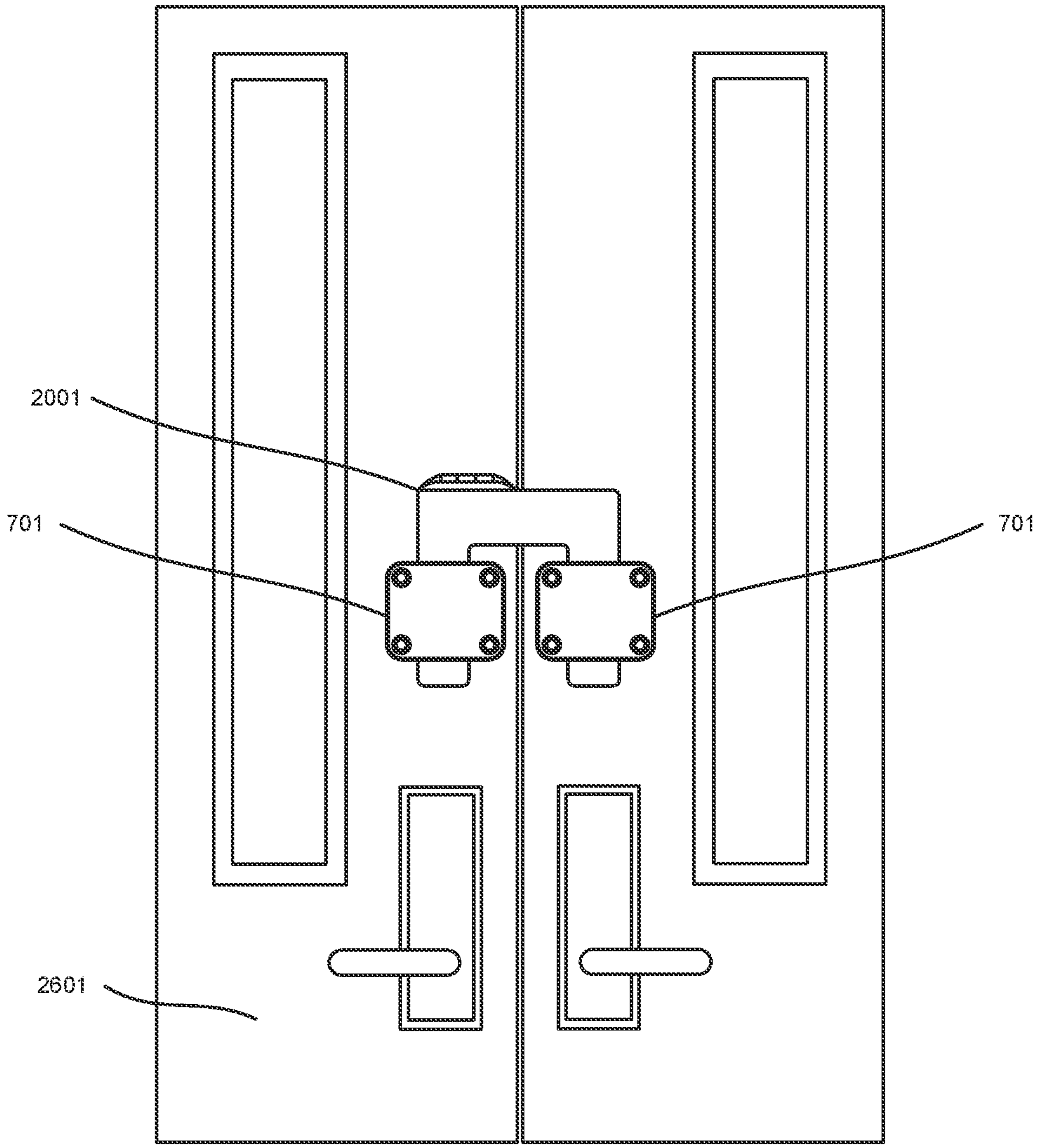
FIG. 26 is a front perspective view of the further alternate embodiment of the latch depicted in FIG. 20, inserted within, and fully engaged with, a plurality of lock plates mounted on double doors.

Referring now to FIG. 26, shown is a front perspective view of the further alternate embodiment of the latch (2001) depicted in FIG. 20, inserted within, and fully engaged with, a plurality of lock plates (701) mounted on double doors (2601). It should be noted that the latch (2001) and lock plates (701) are depicted having oversized dimensions relative to the structures of the door merely for the purpose of better illustrating the structures of such latch and lock plates. Embodiments of the latch and/or lock plates may be constructed so as to have alternate dimensions, depending on factors such as the dimensions of the door(s) to be secured, the securing power sought to be achieved by the locking device, and the desired size of the latch for purposes of storage and portability (for example, a smaller latch may be desired to improve its portability). The alternate embodiment of the latch (2001) is configured for securing/locking double doors found in classrooms and other locations such as businesses, hospitals, community living centers, residences, etc. The lock plates are mountable on respective doors so as to be substantially adjacent to one another, and adjacent to the edges of the respective doors to which they are mounted as depicted in FIG. 26. The further alternate embodiment of the latch (2001) may be modified in other alternate embodiments to include a wedge shaped first lower end or second lower end of the type or similar type as depicted in FIG. 13.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes that come within the meaning and range of equivalency of the claims are embraced therein. Further, the recitation of method steps does not denote a particular sequence for execution of the steps. Such method steps may therefore be performed in a sequence other than that recited unless the particular claim expressly states otherwise.

I claim:

1. A locking device comprising: a removable latch having a first top lateral body from which a first vertical elongate shaft extends in a downward direction therefrom, said latch having a second top lateral body from which a second vertical elongate shaft extends in a downward direction therefrom, said first top lateral body being connected to, and positioned substantially perpendicular to, said second top lateral body; a curved handle of said latch protruding from at least a first top side of said first top lateral body or a second top side of said second top lateral body; a first lock plate having a first aperture formed on a first top side thereof, said first plate being adapted for mounting on a door; and a second lock plate having a second aperture formed on a second top side thereof, said second plate being adapted for mounting on a wall or door frame, wherein a first lower end of said first vertical elongate shaft is sized and shaped to mate with said first aperture of said first lock plate, wherein a second lower end of said second vertical elongate shaft is sized and shaped to mate with said second aperture of said second lock plate, wherein said latch is not tethered to said first lock plate or said second lock plate, wherein said first vertical elongate shaft is configured to slide downward through said first aperture of said first lock plate until a first bottom side of said first top lateral body abuts said first top side of said first lock plate to halt downward sliding travel of said latch, wherein said second vertical elongate shaft is configured to slide downward through said second aperture of said second lock plate until a second bottom side of said second top lateral body abuts said second top side of said second lock plate to halt downward sliding travel of said latch;

wherein at least a lower portion of said first vertical elongate shaft or said second vertical elongate shaft of said removable latch is constructed of a flexible material; and wherein one or both of said first lower end of said first vertical elongate shaft or said second lower end of said second vertical elongate shaft of said removable latch is wedge shaped, wherein a thickness of a front side of said one or both of said first lower end of said first vertical elongate shaft or said second lower end of said second vertical elongate shaft of said removable latch is tapered.

2. The locking device of claim 1, wherein said wedge shaped one or both of said first lower end of said first vertical elongate shaft or said second lower end of said second vertical elongate shaft has a shelf formed thereon that is configured to engage a respective bottom edge of said first lock plate or said second lock plate to prevent upward sliding movement of said latch, wherein a user-supplied force applied to said front side of said wedge shaped first lower end of said first vertical elongate shaft or second lower end of said second vertical elongate shaft causes said first lower end of said first vertical elongate shaft or second lower end of said second vertical elongate shaft to flex and disengage from said respective bottom edge of said first lock plate or said second lock plate to allow upward sliding movement of said latch.

3. The locking device of claim 1, wherein said first top lateral body of said removable latch has a first surface area that is larger than a second surface area of said second top lateral body of said removable latch.

4. The locking device of claim 1, wherein a middle top lateral body of said latch is positioned intermediate said first top lateral body and said second top lateral body, said middle top lateral body being curved.

5. The locking device of claim 1, wherein said first lower end of said first vertical elongate shaft and said lower end of said first vertical elongate shaft each have a rectangular cross section.

6. The locking device of claim 1, wherein said first locking plate is configured for mounting to said door with one or more fasteners.

7. The locking device of claim 1, wherein said second locking plate is configured for mounting to said door frame with one or more fasteners.

8. The locking device of claim 1, wherein said latch is constructed of a metal.

* * * * *